(12) United States Patent
Kani

(10) Patent No.: US 8,563,108 B2
(45) Date of Patent: Oct. 22, 2013

(54) SAPONIFIED ETHYLENE-VINYL ESTER COPOLYMER RESIN COMPOSITION AND MULTILAYER STRUCTURE USING THE COMPOSITION

(71) Applicant: The Nippon Synthetic Chemical Industry Co., Ltd., Osaka (JP)

(72) Inventor: Shouichi Kani, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 13/669,874

(22) Filed: Nov. 6, 2012

(65) Prior Publication Data

US 2013/0065001 A1   Mar. 14, 2013

Related U.S. Application Data

(63) Continuation of application No. PCT/JP2011/065471, filed on Jul. 6, 2011.

(30) Foreign Application Priority Data

Jul. 9, 2010 (JP) .................................. 2010-156381

(51) Int. Cl.
 *C08K 5/09* (2006.01)
 *C08K 5/20* (2006.01)
 *C08K 5/17* (2006.01)
 *B32B 27/08* (2006.01)
 *B32B 1/02* (2006.01)

(52) U.S. Cl.
 USPC .......... 428/35.7; 428/483; 524/284; 524/400; 524/557

(58) Field of Classification Search
 USPC .......................................... 524/284, 400, 557
 See application file for complete search history.

(56) References Cited

U.S. PATENT DOCUMENTS

| | | | |
|---|---|---|---|
| 6,232,382 B1 * | 5/2001 | Ninomiya et al. | 524/400 |
| 6,613,833 B2 * | 9/2003 | Kawahara et al. | 524/557 |
| 6,753,370 B2 * | 6/2004 | Nakatsukasa et al. | 524/400 |
| 6,838,029 B2 * | 1/2005 | Kawahara et al. | 264/141 |
| 6,921,790 B2 * | 7/2005 | Nakano et al. | 524/503 |
| 6,964,990 B2 * | 11/2005 | Kazeto et al. | 524/284 |
| 2002/0169253 A1 | 11/2002 | McGee | |
| 2003/0060550 A1 | 3/2003 | Inomata et al. | |
| 2005/0038163 A1 | 2/2005 | Shindome et al. | |
| 2005/0096419 A1 | 5/2005 | Inomata et al. | |
| 2005/0164021 A1 | 7/2005 | Inoue et al. | |
| 2011/0020626 A1 | 1/2011 | Okamoto et al. | |

FOREIGN PATENT DOCUMENTS

| | | | |
|---|---|---|---|
| EP | 892006 A2 * | 1/1999 | .............. C08J 3/12 |
| EP | 1801154 A1 * | 6/2007 | .............. B23B 27/08 |
| JP | 56-120779 | 9/1981 | |
| JP | 11-35773 | 2/1999 | |
| JP | 11-106592 | 4/1999 | |
| JP | 2001-164059 | 6/2001 | |
| JP | 2001-511211 | 8/2001 | |
| JP | 2005-82226 | 3/2005 | |
| JP | 2005-89483 | 4/2005 | |
| JP | 2005-89482 | 7/2005 | |
| JP | 2005-194292 | 7/2005 | |
| JP | 2006-312313 | 11/2006 | |
| WO | 2009/128411 | 10/2009 | |

OTHER PUBLICATIONS

Search report from International Application No. PCT/JP2011/065471, mail date is Jan. 12, 2012.

* cited by examiner

*Primary Examiner* — Vu A Nguyen

(74) *Attorney, Agent, or Firm* — Greenblum & Bernstein, P.L.C.

(57) ABSTRACT

Disclosed is an EVOH resin composition which exhibits coloration resistance and thermal resistance even at high temperature, and which has excellent adhesiveness to a thermoplastic resin composition. Such EVOH resin composition can provide a multilayer structure having excellent appearance. The EVOH resin composition comprises (A) an EVOH resin, (B) an alkaline earth metal, (C) an alkali metal, and (D) a carboxylic acid having from 2 to 4 carbon atoms, wherein the contents of the components (B), (C) and (D) are adjusted to the specific range.

16 Claims, No Drawings

SAPONIFIED ETHYLENE-VINYL ESTER COPOLYMER RESIN COMPOSITION AND MULTILAYER STRUCTURE USING THE COMPOSITION

CLAIM FOR PRIORITY

This application is a continuation of PCT/JP2011/065471 filed Jul. 6, 2011, and claims the priority benefit of Japanese Application No. 2010-156381, filed Jul. 9, 2010, the contents of which is expressly incorporated by reference in its entirety.

TECHNICAL FIELD

The present invention relates to a saponified ethylene-vinyl ester-based copolymer (hereinafter, sometimes referred to as "EVOH") resin composition which can provide a multilayer structure having excellent appearance even by melt-molding at high temperatures, in particular, to EVOH resin composition which can provide a multilayer structure having excellent appearance by coinjecting or coextruding with polyester-based resin such as polyethylene terephthalate (hereinafter, sometimes referred to as "PET resin"), and a multilayer structure using the EVOH resin composition.

BACKGROUND ART

Generally, a multilayer structure obtained by laminating layers of saponified ethylene-vinyl ester-based copolymer resin (EVOH resin) is used for giving gas barrier properties to films or containers made of thermoplastic resin such as polyester or polyolefin.

Adhesiveness of EVOH resin to thermoplastic resin such as polyester or polyolefin is low. Accordingly, in manufacturing a multilayer structure containing thermoplastic resin layer and EVOH resin layer, normally, an adhesive resin layer (normally using acid anhydride modified resin) is interposed between these layers.

However, in a certain molding method, it may be difficult to interpose an adhesive resin layer between an EVOH resin layer and a thermoplastic resin layer. As for a coinjection molding machine, a molding machine using two types of materials is mainly used. Accordingly, for instance, in the case where PET bottles having a 2-type 3-layer structure such as PET/EVOH/PET with gas barrier properties are manufactured by coinjection molding, it is difficult to interpose, between the PET layer and the EVOH layer, an adhesive resin layer made of other resin material, in view of the performance of the molding machine. Thus, there is a demand for EVOH resin capable of providing a multilayer structure having excellent delamination resistance, without interposing an adhesive resin layer.

Improved adhesiveness to thermoplastic resin has been found in an EVOH resin composition containing specific metal in EVOH resin. Use of the EVOH resin composition enables to manufacture a multilayer structure containing layers of thermoplastic resin such as polyester, without using an adhesive resin layer. Thus, research and development have progressed for manufacturing such an EVOH resin composition.

For instance, JP 2005-82226A (patent document 1) proposes a container manufactured by subjecting a resin composition containing a salt, an oxide, or a hydroxide of at least one kind of metal selected from the group consisting of zinc, nickel, iron, chrome, vanadium, calcium and magnesium, in a concentration of 0.001 to 1 wt % (10 to 10,000 ppm) relative to EVOH resin, and thermoplastic polyester to coinjection stretch blow molding. Specifically, a container manufactured by subjecting an EVOH resin composition added with 0.088 wt % magnesium acetate tetrahydrate or 0.022 wt % zinc acetate dehydrate, and polyester to coinjection stretch blow molding has a low delamination resistance against impact, as compared with a container manufactured by coinjection stretch blow molding with use of EVOH resin without adding these acetate metal salts (see Table 1).

Further, JP 2005-89482A (patent document 2) discloses a blow-molded container composed of, as an EVOH resin composition for use in a 2-type 3-layer multilayer structure of PET/EVOH/PET by coinjection molding, an EVOH resin composition containing 0.1 to 20 μmol/g alkali metal salt in terms of alkali metal; 0 to 2 μmol/g carboxylate radical (C1) extracted by 10-hour immersion in water at 95° C.; and 0 to 40 μmol/g carboxylate radical (C2) extracted by 10-hour immersion in an aqueous solution containing 0.05 mol sodium hydroxide at 95° C. Specifically, patent document 2 describes that with use of EVOH resin (example 1) containing, in EVOH resin composition pellets, 3.40 μmol/g potassium salt in terms of potassium, 1.2 μmol/g phosphate compound in terms of phosphate radical, and 0 ppm carboxylate radical (C1) obtained by isolation/extraction by 10-hour immersion in hot water at 95° C., no hard spots and no coloration were observed in the containers (bottles), even after the 2-type 3-layer multilayer structure was continuously subjected to coinjection blow molding for 72 hours (see paragraphs 0119, 0120 and Table 2).

[Patent document 1] JP2005-82226A
[Patent document 2] JP2005-89482A (counterpart US application publication No. 2005038163)

DISCLOSURE OF THE INVENTION

Technical Problem to be Solved by the Invention

Patent document 1 discloses that an EVOH resin composition containing specific metal has improved delamination resistance against impact in coinjection molding the EVOH resin composition with PET resin requiring a high-temperature condition, but fails to describe appearance such as presence/absence of thermal coloration, bubbles or pinholes of the EVOH resin composition layer.

Patent document 2 discloses that adding an alkali metal salt for giving adhesiveness between layers; and reducing the amount of carboxylate radical (i.e. acetate) which is contained in EVOH resin and isolated/extracted by 10-hour immersion in hot water at 95° C. by washing with a specific washing liquid containing carbonated water, for improving melt stability and preventing generation of odor or acidic taste. Further, a phosphoric acid compound is added for securing long-run workability in melt molding, and particularly for giving coloration resistance.

An object of the invention is to provide an EVOH resin composition having a different composition from that disclosed in the Patent documents 1 and 2, and excellent in coloration resistance at high-temperature condition, heat resistance, and adhesiveness to thermoplastic resins such as polyester-based resin, as well as being capable of providing a multilayer structure with excellent appearance.

Means for Solving the Problems

A saponified ethylene-vinyl ester-based copolymer resin composition of the present invention comprises (A) a saponified ethylene-vinyl ester-based copolymer resin (EVOH resin); (B) an alkaline earth metal; (C) an alkali metal; and (D)

a carboxylic acid having from 2 to 4 carbon atoms. The resin composition satisfies the following requirements (α), (β), and (γ):

(α) the content of the alkaline earth metal (B) to the saponified ethylene-vinyl ester-based copolymer resin (A) is more than 10 ppm but not more than 50 ppm;
(β) the content ratio (C/B) of the alkali metal (C) to the alkaline earth metal (B) ranges from 0.001 to 0.5; and
(γ) the content ratio (D/B) of the carboxylic acid (D) to the alkaline earth metal (B) ranges from 5 to 30.

The EVOH resin composition has a feature that the alkaline earth metal (B) is contained in the specific amount and thereby improving adhesiveness of the EVOH resin (A) to thermoplastic resins such as polyester resin. The alkaline earth metal (B) may act as a catalyst of esterification between a carboxyl group of polyester-based resin and a hydroxyl group of EVOH resin. Accordingly, an improving effect of the adhesiveness to polyester-based resin may be expected.

Also, the EVOH resin composition has a feature that the content of the alkali metal (C) is adjusted to the specified range relative to that of the alkaline earth metal (B).

In the production of EVOH resin, a hydroxide of alkali metal such as sodium hydroxide and potassium hydroxide is used for a saponification catalyst. The hydroxide may react with acetic acid by-produced during saponification or carboxyl groups slightly existing at the terminal of EVOH polymer chain to form a salt of the alkali metal. For this reason, thus produced EVOH resin usually contains an alkali metal, and the content of the alkali metal is about 3000 ppm in terms of the metal in the EVOH resin before washing or rinsing. In order to adjust the content ratio between the alkaline earth metal (B) and the alkali metal (C) to the specified range, the EVOH resin composition may be washed and/or rinsed to remove the alkali metal therefrom, if necessary.

Furthermore, the EVOH resin composition has a larger content of the carboxylic acid (D), as comparing with the content of the carboxylic acid having from 2 to 4 carbon atoms contained as an impurity in an ordinary EVOH resin, and the content of the carboxylic acid (D) is adjusted to the specific range relative to the content of the alkaline earth metal (B).

In an typical producing method of EVOH resin, a trace amount of carboxylic acid derived from a monomer used in polymerization process remains in the resulting polymer and/or a trace amount (at most, less than 10 ppm) of carboxylic acid is by-produced in saponification process. In some cases, a carboxylic acid is added for controlling pH of solution in an ordinary producing method of EVOH resin. For these reasons, an EVOH resin produced by an ordinary process contains a carboxylic acid as an impurity. On the other hand, the quantity of the carboxylic acid having from 2 to 4 carbon atoms in the EVOH resin composition of the invention is larger than that in the ordinary EVOH resin, and is adjusted to the specific range relative to the content of the alkaline earth metal (B) in the inventive EVOH resin composition.

The weight reduction degree of the EVOH resin composition of the invention after placing in a nitrogen atmosphere at 280° C. for 1 hour is preferably 15% by weight or less.

In a preferable embodiment of the EVOH resin composition, the alkaline earth metal (B) is magnesium. Also a preferred carboxylic acid (D) is mono- or di-carboxylic acid having from 2 to 4 carbon atoms, and a preferred alkali metal (C) is potassium or sodium. Moreover, the content of phosphate radical in the saponified ethylene-vinyl ester-based copolymer resin (A) is preferably 5 ppm or less.

According to the preferable embodiment of the EVOH resin composition of the invention, a preferred saponified ethylene-vinyl ester-based copolymer resin contains 1,2-diol unit represented by the following formula.

[formula 1]

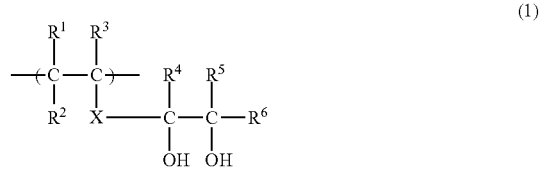

In the formula, each of $R^1$, $R^2$, and $R^3$ represents independently a hydrogen atom or an organic group, and X represents single bond or a binding chain, and each of $R^4$, $R^5$, and $R^6$ represents independently a hydrogen atom or an organic group.

According to another embodiment, the EVOH resin composition further comprises (E) a basic amine compound, in particular, a basic amino acid. The content of the basic amine compound (E) is preferably in the range from 0.01 to 10 parts by weight based on the 100 parts by weight of the EVOH resin.

A multilayer structure of the invention contains at least one layer made of the above-mentioned EVOH resin composition (EVOH resin composition layer). A preferable multilayer structure contains a thermoplastic resin layer adjacent to at least one surface of the EVOH resin composition layer. The preferable thermoplastic resin layer is polyester-based resin layer. According to the invention, a preferable multilayer structure comprises a structure unit of polyester-based resin layer/saponified ethylene-vinyl ester-based copolymer resin composition layer/polyester-based resin layer.

A multilayer hollow container of the invention comprises a multilayer structure of any one of the aforementioned embodiments, and is formed preferably by coinjection molding.

Effect of the Invention

The EVOH resin composition of the present invention has excellent thermal stability at high temperature, and therefore can provide a multilayer structure having an excellent appearance as well as excellent delamination resistance without interposing an adhesive resin layer between a layer of the EVOH resin composition and a layer of a thermoplastic resin such as polyester resin.

MODE FOR CARRYING OUT OF THE INVENTION

The following will explain the constitution of the invention but merely show embodiment (typical embodiments), and the invention should not be construed as being limited to the examples. First, the resin composition of the present invention will be described below.

<EVOH Resin Composition>

A saponified ethylene-vinyl ester-based copolymer resin composition of the present invention comprises (A) a saponified ethylene-vinyl ester-based copolymer resin (EVOH resin) as a main component, (B) an alkaline earth metal, (C) an alkali metal, and (D) a carboxylic acid having from 2 to 4 carbon atoms, wherein the content of the alkali metal (C) is adjusted to a specific lowered level, and the content of the carboxylic acid (D) is increased to a specific level, both compared with their contents in a typical EVOH resin.

[(A) EVOH Resin]

EVOH resin is the main component of the resin composition of the invention, and is contained in a concentration of usually 90% by weight or more, preferably 95% by weight or more, based on the weight of the resin composition.

The EVOH resin is a resin produced by copolymerizing ethylene and vinyl ester and then saponifying the obtained copolymer. Used may be an EVOH resin known as a material for an ordinary wrapping film for foods.

Copolymerizing ethylene and a vinyl ester can be performed by any polymerization manner known in the art, for example, solution polymerization, suspension polymerization, emulsion polymerization, and so on.

Saponifying the obtained ethylene-vinyl ester copolymer can also be performed by a known process in which ethylene-vinyl ester copolymer solution (solvent: alcohol or water/alcohol) is saponified in the presence of an alkali catalyst or an acid catalyst. Examples of the alkali catalyst include alkali metal hydroxides such as potassium hydroxide and sodium hydroxide, and alkali metal alcoholates such as sodium methylate, sodium ethylate, potassium methylate, lithium methylate and so on. Examples of the acid catalyst include sulfuric acid, hydrochloric acid, nitric acid, and meta sulphonic acid. Zeolite or cation exchange resin may also be used as a saponification catalyst.

Vinyl acetate is typically used as the vinyl ester-based monomer, however, it is possible to use other vinyl ester monomer such as an aliphatic vinyl ester usually having from 3 to 20, preferably 4 to 10, particularly preferably 4 to 7 carbon atoms; aromatic vinyl ester, and so on. Examples of the aliphatic vinyl esters include, for instance, vinyl formate, vinyl propionate, vinyl valerate, vinyl butyrate, vinyl isobutyrate, vinyl pivalate, vinyl caprate, vinyl laurate, vinyl stearate, vinyl versatate and so on, and examples of the aromatic vinyl ester include vinyl benzonate and so on. These monomers usually may be used alone or in combination of two or more thereof depending on necessity.

The EVOH resin used in the invention has an ethylene unit of usually 20 to 60 mol %, preferably 25 to 50 mol %, particularly preferably 25 to 40 mol %, as a measured value based on ISO14663. EVOH resin having too low ethylene unit content tends to be lowered in gas-barrier property at high humidity condition, water-solubility resistance, and melt-molding property. On the contrary, EVOH resin having too high ethylene unit content, which has a relatively decreased content of hydroxyl group, tends to lack gas-barrier property as well as adhesiveness to polyester-based resin.

The saponification degree of the vinyl ester unit in the EVOH resin is in the range of usually 90 to 100 mol %, preferably 95 to 100 mol %, and particularly preferably 99 to 100 mol %, as measured based on JIS K6726 with respect to a solution of EVOH resin homogeneously dissolved in water/methanol solvent. When the saponification degree is unduly low, properties such as gas-barrier property, thermal stability, and humidity resistance tend to be lowered.

The EVOH resin has a melt flow rate (MFR) (210° C., load of 2160 g) usually between 0.5 g/10 min and 100 g/10 min, preferably between 1 g/10 min and 50 g/10 min, particularly preferably between 2 g/10 min and 35 g/10 min. When the MFR is unduly high, film productivity tends to become unstable. When the MFR is unduly low, the viscosity is too high to flow smoothly, and as a result, an inferior appearance having streak, nonuniformity, and so on tends to be occurred in the obtained film.

In addition to ethylene and vinyl ester, an ethylenically unsaturated monomer copolymerizable with ethylene or vinyl ester may be copolymerized for the EVOH resin (A), in the range that the effect of the invention is not inhibited, for instance, 5 mol % or less. Examples of the ethylenically unsaturated monomer include olefins such as propylene, 1-butene, isobutene and so on; hydroxy group-containing α-olefins such as 3-buten-1-ol, 4-penten-1-ol, 5-hexene-1,2-diol or its derivatives such as ester thereof, acyl thereof, and so on; unsaturated acid such as acrylic acid, methacrylic acid, crotonic acid, phthalic acid or its anhydrous, maleic acid or its anhydrous, itaconic acid or its anhydrous etc. or salt thereof, or mono- or di-alkyl ester having from 1 to 18 carbon atoms; acrylamides such as acrylamide, N-alkyl (having from 1 to 18 carbon atoms) acrylamide, N,N-dimethylacrylamide, 2-acrylamide propanesulfonic acid or a salt thereof, acrylamide propyldimethylamine or an acid salt thereof or a quaternary salt thereof, and so on; methacrylamides such as methacrylamide, N-alkyl (having from 1 to 18 carbon atoms) methacrylamide, N,N-dimethylmethacrylamide, 2-methacrylamide propanesulfonic acid or a salt thereof, methacrylamide propyldimethylamine or an acid salt thereof or quaternary salt thereof, and so on; N-vinylamides such as N-vinylpyrrolidone, N-vinylformamide, N-vinylacetamide and so on; vinyl cyanides such as acrylonitrile, methacrylonitrile and so on; vinyl ethers such as alkyl (having from 1 to 18 carbon atoms) vinyl ether, hydroxyalkyl vinyl ether, alkoxyalkyl vinyl ether and so on; vinyl halide compounds such as vinyl chloride, vinylidene chloride, vinyl fluoride, vinylidene fluoride, vinyl bromide and so on; vinylsilane such as trimethoxyvinylsilane and so on; allyl halide compounds such as allyl acetate, allyl chloride and so on; allyl alcohols such as allyl alcohol, dimethoxy allyl alcohol and so on; trimethyl-(3-acrylamide-3-dimetyl propyl)-ammonium chloride, acrylamide-2-methylpropanesulfonic acid and so on.

In addition, the EVOH resin may be post-modified by a known post-modification such as urethanation, acetalization, cyanoethylation, oxyalkylenation and so on.

Particularly, the EVOH resin copolymerized with a hydroxy group-containing α-olefin, especially the EVOH resin containing 1,2-diol unit in a side chain thereof, is preferred because secondary formability in molding such as blow molding and vacuum forming is improved.

The EVOH resin containing 1,2-diol unit in a side chain thereof is an EVOH resin having the following structural unit (1).

[formula 1]

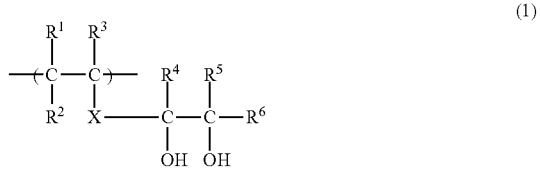

(1)

In the formula (1), each of $R^1$, $R^2$, and $R^3$ is independently a hydrogen atom or an organic group, X represents single bond or a binding chain, and each of $R^4$, $R^5$ and $R^6$ is independently a hydrogen atom or an organic group.

The organic group employed for $R^1$-$R^6$ includes, for instance, a saturated hydrocarbon group such as methyl, ethyl, n-propyl, iso-propyl, n-butyl, isobutyl, tert-butyl, and so on; aromatic hydrocarbon group such as phenyl, benzyl and so on; halogen atom, hydroxyl group, acyloxy group, alkoxycarbonyl group, carboxyl group, and sulfonic acid group, but not limited thereto.

Any of $R^1$-$R^6$ is preferably a hydrogen atom or saturated hydrocarbon group having usually from 1 to 30, particularly from 1 to 15, more particularly from 1 to 4 carbon atoms. Hydrogen atom is most preferred from the point of excellent gas barrier property. Accordingly, it is most preferred that all of $R^1$-$R^6$ are hydrogen atoms.

Typically, X in the formula (1) is a single bond. Accordingly, the most preferable 1,2-diol unit is the 1,2-diol unit wherein all $R^1$-$R^6$ are hydrogen atoms and X is a single bond, i.e. the structural unit represented by the formula (1a) shown in below.

[formula 1a]

(1a)

X in the formula (1) may be a binding chain unless the effect of the invention is not inhibited. The binding chain includes hydrocarbon chains such as alkylene, alkenylene, alkynylene, phenylene, naphthylene and so on, wherein the hydrocarbon is substituted with a halogen such as fluorine, chlorine, bromine and so on; an ether bond-containing group such as —O—, —($CH_2O$)$_m$—, —($OCH_2$)$_m$—, —($CH_2O$)$_m CH_2$— and so on; carbonyl group-containing group such as —CO—, —COCO—, —CO($CH_2$)$_m$CO—, —CO($C_6H_4$)CO— and so on; sulfur atom-containing group such as —S—, —CS—, —SO—, —$SO_2$— and so on; nitrogen atom-containing group such as —NR—, —CONR—, —NRCO—, —CSNR—, —NRCS—, —NRNR— and so on; hetero atom (e.g. phosphorus)-containing group such as —$HPO_4$— and so on; silicon atom-containing group such as —Si(OR)$_2$—, —OSi(OR)$_2$—, —OSi(OR)$_2$O— and so on; titanium atom-containing group such as —Ti(OR)$_2$—, —OTi(OR)$_2$—, —OTi(OR)$_2$O— and so on; metal atom (e.g. aluminum)-containing group such as —Al(OR)—, —OAl(OR)—, —OAl(OR)O— and so on, wherein R represents independently a substituting group, preferably hydrogen atom or alkyl group, and m is a natural number usually from 1 to 30, preferably from 1 to 15, more preferably from 1 to 10. Favorable binding chains are —$CH_2OCH_2$— and hydrocarbon chain having from 1 to 10, more preferably from 1 to 6, particularly preferably 1 carbon atom, from the viewpoint of stability in production and use.

According to the invention, an EVOH resin having the structural unit (1) (a first EVOH resin) may be blended with another EVOH resin (a second EVOH resin) having a different structural unit, ethylene content, saponification degree, or molecular weight from each other.

Examples of another EVOH resin are, for instance, an EVOH resin having a different structural unit such as that consisting of ethylene unit and vinyl alcohol unit, and a modified EVOH resin having a functional group such as 2-hydroxyethoxy group in a side chain; an EVOH resin having a different ethylene content such as that having an ethylene content difference of preferably 1 mol % or more (furthermore 2 mol % or more, especially from 2 to 20 mol %), wherein structural units other than ethylene unit may be same or different from the first EVOH resin.

The methods of blending the plural kinds of EVOH resins are, but not limited to, for instance, (i) a method of mixing EVA pastes corresponding to a first and second EVOH resins and then saponifying the mixture; (ii) a method of dissolving a first and second EVOH resins each in alcohol or a mixed solvent (water and alcohol), and mixing the obtained EVOH resin solutions; and (iii) a method of mixing pellets or powders of a first and second EVOH resins and melt-kneading the obtained mixture.

[(B) Alkaline Earth Metal]

In general, (B) an alkaline earth metal is added to EVOH resin, according to needs, for the purpose of improving long-run property in melt-molding at a temperature of 150-250° C. and self-purge property. According to the invention, a specified amount of the alkaline earth metal (B) is added, for the purpose of improving adhesiveness of EVOH resin to a layer of thermoplastic resin such as polyester resin, which is a feature of the invention. The alkaline earth metal (B) is supposed to act as a catalyst of esterification between a carboxyl group contained in a polyester-based resin and a hydroxyl group of EVOH resin, and to contribute to improve the adhesiveness.

The concentration of the alkaline earth metal (B) is more than 10 ppm but not more than 50 ppm, preferably from 15 to 45 ppm, more preferably from 20 to 40 ppm, most preferably from 25 to 35 ppm, relative to the EVOH resin (A).

When the content of the alkaline earth metal is unduly high, the thermal decomposition of EVOH resin is promoted and gas is likely to generate by the decomposition. Particularly, the unduly high content of the alkaline earth metal causes coloration and bubbles in a multilayer structure produced by melt-molding at high temperature. On the other hand, when the content is unduly low, the adhesiveness of EVOH resin layer to a polyester-based resin layer is insufficient, and delamination between the layers is likely to occur.

Examples of the alkaline earth metal (B) include beryllium, magnesium, calcium, strontium, and barium. They may be used alone or in combination of two or more of them. Of these, magnesium and calcium are preferred, and magnesium is more preferred.

The alkaline earth metal is usually contained in a form of low molecular compound such as salt thereof or hydroxide thereof, preferably salt thereof, from the point of its dispersity in EVOH resin.

In the case of alkaline earth metal salt, a salt of inorganic acid such as carbonate, hydrogencarbonate, phosphate, borate, sulfate, chloride and so on; and a salt of organic acid such as mono-carboxylate having from 2 to 11 carbon atoms (e.g. acetate, butyrate, propionate, enanthate, caprate), di-carboxylate having from 2 to 11 carbon atoms (e.g. oxalate, malonate, succinate, adipate, suberate, and sebacate), and monocarboxylate having 12 or more carbon atoms (e.g. laurate, palmitate, stearate, 12-hydroxy stearate, behenate, montanate) and so on. These salts may be used as a mixture thereof.

A salt of the organic acid weak in acidity is preferably used because more weak in acidity of the organic acid, more improved in the adhesiveness to polyester-based resin. Monocarboxylate having from 2 to 4 carbon atoms which is water-soluble low molecular compound is more preferable, and acetate and propionate are further more preferable, and acetate is most preferable.

A phosphate provides a strong acidic anion and causes to lower adhesiveness to polyester-based resin. Accordingly, in the case that phosphate is contained, it is preferable that the total amount of the phosphate and the phosphoric anion of the alkaline metal salt (C) is not more than 5 ppm in terms of the phosphate radical. The amount of the phosphate radical is quantitatively analyzed by ion chromatography of the extracted solution by treating powdery EVOH resin composition with 0.01 N hydrochloric acid solution at 95° C. for 6 hours.

[(C) Alkali Metal]

(C) an alkali metal is lithium, sodium, potassium, rubidium, or cesium, or a mixture of two or more of them. Of these, sodium and potassium are preferred, in particular, sodium is preferred.

Generally, an alkali metal is contained in a form of low molecular compound, for instance, salt thereof and hydroxide thereof. Preferably, an alkali metal salt is contained due to the superior dispersity in EVOH resin.

The alkali metal salt includes a salt of inorganic acid such as carbonate, hydrogencarbonate, phosphate, borate, sulfate, chloride and so on; and a salt of organic acid such as monocarboxylate having from 2 to 11 carbon atoms (e.g. acetate, butyrate, propionate, enanthate, caprate), di-carboxylate having from 2 to 11 carbon atoms (e.g. oxalate, malonate, succinate, adipate, suberate, and sebacate), and monocarboxylate having 12 or more carbon atoms (e.g. laurate, palmitate, stearate, 12-hydroxy stearate, behenate, montanate) and so on. These salts may be used as a mixture thereof.

The organic acid salt is preferred, monocarboxylate having from 2 to 4 carbon atoms, which is water-soluble low molecular compound, is more preferred, acetate and propionate are particularly preferred, and acetate is most preferred.

The alkali metal (C) is contained such that a weight ratio of the alkali metal (C) to alkaline earth metal (B), i.e. ((C)/(B)), satisfies the following requirement. That is, the weight ratio (C)/(B) is from 0.001 to 0.5, preferably from 0.005 to 0.2, furthermore preferably from 0.01 to 0.1.

The content of the alkali metal (C) relative to the EVOH resin is usually more than 0.01 but not more than 25 ppm, preferably from 0.05 to 10 ppm, more preferably from 0.1 to 5 ppm.

Particularly, in the case that the alkali metal (C) is contained sodium, the upper content of sodium is preferably set to be less than the above requirement, because sodium largely causes thermal coloration and/or thermal decomposition when melt-molding at high temperature. Accordingly, the weight ratio of sodium to the alkaline earth metal (B), i.e. (sodium)/(B), ranges preferably from 0.001 to 0.2, more preferably from 0.001 to 0.1.

The content of sodium ranges usually from 0.01 to 5 ppm, preferably from 0.01 to 2 ppm, relative to the EVOH resin.

A phosphate provides a strong acidic anion and causes to lower adhesiveness to polyester-based resin. Accordingly, the total content of phosphate radical derived from the alkali metal phosphate and alkaline earth metal phosphate is preferably set to 5 ppm or less. The phosphate radical is quantitatively analyzed by ion chromatography of the extracted solution by treating powdery EVOH resin composition with 0.01 N hydrochloric acid solution at 95° C. for 6 hours.

Unduly high value of (C)/(B) means an excess content of the alkali metal (C) relative to the alkaline earth metal (B), which causes to produce a noticeably colored EVOH resin with lowered heat resistance. If such EVOH resin is used for manufacturing a multilayer structure by melt-molding at high temperature, the obtained layer of the EVOH resin composition has inferior appearance because of bubbles resulting from gas generated by decomposition and pinholes around the bubbles, and furthermore gas-barrier property of the layer is impaired.

EVOH resin is manufactured by using alkali metal hydroxide such as sodium hydroxide or potassium hydroxide, as a saponification catalyst. Alkali metal such a catalyst inevitably exists in EVOH resin, as sodium acetate which is by-produced by saponification, or forms a salt with traces of carboxyl group at a polymer chain terminal of EVOH resin. Under the above circumstances, the amount of alkali metal in EVOH resin is about 3,000 ppm with respect to the EVOH resin in an unwashed state.

However, in the inventive resin composition, it is necessary to contain alkali metal in the aforementioned amount range. Accordingly, in the case where alkali metal of an amount equal to or larger than a predetermined amount remains in the EVOH resin, the alkali metal is removed by e.g. washing. In the invention, the alkali metal content is adjusted to the above specific trace amount by washing the EVOH resin more thoroughly than in an ordinary production. Specifically, it is difficult to remove alkali metal merely by washing with water for achieving the aforementioned specific trace concentration. Accordingly, in the case where EVOH resin manufactured by saponification is used, it is preferable to use water-washed EVOH resin, after the EVOH resin is washed with acid such as acetic acid. Particularly, it is possible to more efficiently remove alkali metal bonded to carboxyl group at a polymer chain terminal by washing with acid.

Alternatively, alkali metal may be added as necessary for improving washing precision, in the case where EVOH resin which hardly contains alkali metal e.g. EVOH resin saponified in the presence of an acid catalyst is used, or in the case where the alkali metal content is adjusted.

[(D) Carboxylic Acid having from 2 to 4 Carbon Atoms]

A monocarboxylic acid, dicarboxylic acid, saturated carboxylic acid, and unsaturated carboxylic acid may be used as (D) a carboxylic acid having from 2 to 4 carbon atoms. These carboxylic acids may have a branched-chain, a substituting group such as hydroxyl group and so on as long as the carbon atoms contained in the carboxylic acid (D) ranges from 2 to 4 in the molecule. Examples of such carboxylic acid include monocarboxylic acid such as acetic acid, butyric acid, and propionic acid; dicarboxylic acid such as oxalic acid, malonic acid, succinic acid, maleic acid, fumaric acid and so on; hydroxy acid such as glycolic acid, lactic acid, tartaric acid, malic acid and so on; unsaturated fatty acid such as acrylic acid, crotonic acid, methacrylic acid and so on.

Among them, mono- or di-carboxylic acid having from 2 to 4 carbon atoms is preferred from the point of its dispersity in EVOH resin, and monocarboxylic acid having from 2 to 4 carbon atoms is more preferred from the economical point, and acetic acid is particularly preferred.

In the prior art, a proper amount of the carboxylic acid (D) is usually blended with EVOH resin for the purpose of improving heat resistance in melt-molding at a temperature of 150-250° C. On the other hand, in the EVOH resin composition according to the invention, the carboxylic acid (D) is added for the purpose of weakening thermal decomposition of the EVOH resin around 280° C., in order to coextrude or coinject a thermoplastic resin having a high melting point such as aromatic polyester-based resin described below with the EVOH resin composition having the adhesiveness improving effect of alkaline earth metal.

For the above reason, the carboxylic acid (D) is contained such that the weight ratio of the carboxylic acid (D) to the alkaline earth metal (B), i.e. (D)/(B), is in the range from 5 to 30, preferably from 10 to 20.

The content of the carboxylic acid (D) is about more than 50 but up to 1500 ppm, preferably from 100 to 1000 ppm, more preferably 200 to 700 ppm, particularly preferably about 250 to 500 ppm, relative to the EVOH resin (A).

If the (D)/(B) ratio is too low, in other words, if the carboxylic acid amount is too small, heat resistance is lowered, and thermal decomposition becomes active around 280° C. This may cause coloration or generation of bubbles in a multilayer structure obtained by melt molding at high temperature. On the other hand, if the (D)/(B) ratio is too high, in other words, the carboxylic acid amount is too large, adhesiveness to a polyester-based resin layer tends to lower.

In this example, in the case where vinyl acetate is used as a raw material monomer for EVOH resin, traces of acetic acid may be contained in a saponified ethylene-vinyl acetate-based copolymer resin. Further, in the case where EVOH resin is manufactured by saponification of ethylene-vinyl acetate-based copolymer, traces (at most, less than 10 ppm) of acetic acid may be by-produced as impurity. Further, in the case where EVOH resin is washed with an aqueous solution containing carboxylic acid such as acetic acid and so on for reducing the amount of the alkali metal (C), traces of carboxylic acid such as acetic acid and so on may also be contained in the EVOH resin.

The inventive resin composition, however, has a feature that carboxylic acid having from 2 to 4 carbon atoms is contained with a concentration equal to or larger than the concentration of carboxylic acid which is normally contained as impurity, and with a specific and sufficiently large amount with respect to the alkaline earth metal (B).

In view of the above, carboxylic acid is added to EVOH resin, as necessary, to meet the aforementioned range requirement.

The carboxylic acid concentration is quantitatively analyzed by ion chromatography of the extracted liquid obtained by treating dried powdery EVOH resin composition with hot water at 95° C. for 10 hours. Accordingly, the component (D) does not include carboxylic acid derived from carboxyl group remained as unsaponified portion in EVOH copolymer chain. On the other hand, in the case where the alkaline earth metal (B) and the alkali metal (C) are contained as respective salts of carboxylic having from 2 to 4 carbon atoms, carboxylic acid ions derived from these metal salts are summed up with the component (D).

[(E) Basic Amine Compound]

According to the embodiment of the invention, the resin composition optionally contains (E) a basic amine compound, in addition to (A) an EVOH resin, (B) an alkaline earth metal, (C) an alkali metal salt, and (D) a carboxylic acid having from 2 to 4 carbon atoms.

The basic amine compound (E) may be any amine compound having a pH between 7 and 14 in 4% aqueous solution (25° C.), and may be primary amine, secondary amine, tertiary amine, or quaternary ammonium salt. Not only a low molecular amine compound but also a polymer having amine may be included in the basic amine compound (E). A preferable basic amine compound is a primary amine or secondary amine. These basic amine compounds may be obtained by synthesizing, but also may be obtained from natural resources. For instance, extracts from natural resources and a secondary product produced by microorganism may be used for the basic amine compound.

When polyester resin is coextruded or coinjected with the EVOH resin composition, the basic amine compound can act as alkali to decompose some ester bonds of the polyester, and then the resultant ester residue may react with OH group of EVOH resin to link to the EVOH resin. Thus adhesiveness between EVOH resin layer and polyester-based resin layer would be enhanced.

The content of the basic amine compound (E) is in the range of preferably 0.01 to 10 parts by weight, more preferably 0.05 to 5 parts by weight, further more preferably 0.1 to 2 parts by weight, relative to 100 parts by weight of the EVOH resin (A). The higher content of the basic amine compound, the more enhanced adhesiveness to polyester-based resin, however, unduly high content of the basic amine compound tends to lower gas-barrier property due to a relatively reduced content of EVOH resin in the resin composition.

Examples of the basic amine compound (E) include aliphatic alkylamine, guanidine-based compound, basic amino acid, melamine-based compound, urea-based compound, ammonium-based compound, amine-based polymer and so on, and a mixture of two or more thereof. A low molecular basic amine compound, in particular, guanidine-based compound or basic amino acid is preferably used because they can improve adhesiveness to polyester-based resin without lowering thermal stability of EVOH resin including thermal decomposition and viscosity increase due to crosslinking.

Any basic amine compound (E), i.e. basic amine polymer or resin as well as low molecular basic amine compound such as basic amino acid or guanidine-based compound, can enhance an adhesiveness to polyester-based resin by the action of nitrogen atom of amine, preferably amino group or imino group. The basic amine polymer or resin may react with EVOH resin in preparing the resin composition due to multiple reaction points of the EVOH resin, resulting in forming a network structure. If the vast polymer having network structure exists, the viscosity of the resin composition is increased during melt-kneading and a multilayer structure with deteriorated appearance such as fish eye would be obtained. In the case of the low molecular basic amine compound, the occasion of forming a network structure is decreased because of less reaction point with EVOH resin, and thus is preferable.

In addition, in the case of EVOH resin composition containing the low molecular basic amine compound, an excessive viscosity increase is not likely even when melt-kneaded at high temperature, which is favorable in production of multilayer structure containing an aromatic polyester-based resin layer. In the case that a multilayer structure containing the aromatic polyester-based resin layer is produced by coextrusion or coinjection, the molding temperature of EVOH resin composition should be elevated up to a molding temperature of aromatic polyester-based resin, and therefore, die temperature where both resin flows are contacted with each other has to be high enough for molding aromatic polyester-based resin. A problematic viscosity increase is not observed during melt-kneading the basic amine compound with EVOH resin at high temperature. This is advantageous because the resin composition is suitable for long-run production of the said multilayer structure and the added amount may be chosen from the wide range for obtaining the expected effect.

The guanidine compounds are guanidine salt such as guanidine carbonate, guanidine phosphate, guanidine sulfamate and so on; and aminoguanidine salt such as aminoguanidine bicarbonate and so on; and other guanidine compounds.

The preferable guanidine compounds for use of the invention are guanidine carbonate (pH=11.4 in 4% aqueous solution (25° C.)), guanidine phosphate (pH=8.8 in 4% aqueous solution (25° C.)), and guanidine sulfamate (pH=7.7 in 4% aqueous solution (25° C.)), and most preferable guanidine compound is guanidine carbonate because the lower acidic anion of the guanidine compound, the more enhanced adhesiveness to polyester-based resin.

Examples of the basic amino acid include arginine (L-arginine: pI=10.76), canavanine (L-canavanine: pI=7.93), ornithine (L-ornithine: pI=10.76), hydroxylysine (L-hydroxylysine: pI=8.64), lysine (L-lysine: pI=9.74), and histidine (L-histidine: pI=7.59).

The basic amino acid used in the invention is an amino acid having not less than 7 of pI and produces a basic solution. The isoelectric point (pI) is the pH at which a molecule carries net zero electrical charge on the whole. Amino acid is an ampholyte having an amino group and a carboxyl group in the molecule. The basic amino acid has a basic character due to extra amino groups on a side chain thereof.

Besides 20 types amino acids making up protein, a modified amino acid and artificial amino acid, for example, arginine (L-arginine: pI=10.76), canavanine (L-canavanine: pI=7.93), ornithine (L-ornithine: pI=10.76), hydroxylysine (L-hydroxylysine: pI=8.64), lysine (L-lysine: pI=9.74), or histidine (L-histidine: pI=7.59) or a mixture thereof, may also be used. Preferably, an amino acid having pI of not less than 9, further not less than 10 may be used.

It is favorable to choose one from amino acids making up protein of organisms, i.e. from the group consisting of arginine, lysine, and histidine. Of these, arginine has a highest pI value and is particularly favorable from the point of enhanced adhesiveness to polyester layer.

D-amino acid and racemic mixture (DL-amino acid) as well as L-amino acid may be used, however, L-amino acid is preferably used because L-amino acid can exist in natural and advantageous for an environmentally gentle and reliable additive used in a packaging materials for foods.

The aforementioned basic amino acids can act as alkali carriers in the EVOH resin composition. Accordingly, contribution to improved adhesiveness between the EVOH resin layer and the polyester resin layer can be expected by the action of the basic amino acids to partially decompose esterbonds of the polyester at the time of coextrusion or coinjection molding, and then by linking the resultant ester residue to an OH group of the EVOH resin.

In addition, since carboxyl group and amino group of amino acid act as an ionic functional group, the amino acid could react with OH group of EVOH resin and/or with ester bond of polyester-based resin, and thereby making chemical bond and/or hydrogen bond between EVOH resin and polyester-based resin. It is expected that the basic amino acid would give an enhanced adhesiveness between EVOH resin and polyester-based resin, and delamination resistance therebetween.

The melamine-based compounds are, for example, melamine, melamine pyrophosphate, melamine sulfate, modified melamine, melamine cyanurate, and other low molecular melamine.

Examples of the urea-based compound include low molecular urea or the derivatives thereof.

Examples of the ammonium-based compound are ammonium carbonate, ammonium hydrogen carbonate, ammonium phosphate, and bistetrazole diammonium.

Examples of the amine-based polymer include alkylene imine polymer such as polyethylene imine, polypropylene imine and so on; imino group-containing polymer such as polycarbodiimide, urea formaldehyde resin, ethylene urea resin and so on; amino group-containing polymer such as polyvinylamine, polyacrylamide, polylysine, melamine resin, modified melamine resin, melamine-urea resin, melamine polyphosphate and so on; polyvinylpyrrolidone, and so on.

[(F) Other Additives]

EVOH resin composition of the invention may contain known additives unless the effect of the invention is inhibited, in a proper amount of, for example, less than 5% by weight based on the total weight of the resin composition. The additives include plasticizer such as aliphatic polyalcohol (e.g. ethylene glycol, glycerin, hexanediol) and so on; lubricant such as saturation aliphatic amide (e.g. stearamide), unsaturated fatty acid amide (e.g. amide oleate), bis fatty acid amide (e.g. ethylene bis stearamide), low molecular weight polyolefin (e.g. polyethylene or polypropylene each having a molecular weight of about 500-10000) and so on; antiblocking agent; antioxidant; colorant; antistatic agent; ultraviolet absorber; insecticide; insoluble inorganic salt (e.g. hydrotalcite); filler (e.g. inorganic filler); oxygen scavenger (e.g. ring-open polymer of cycloalkene such as polyoctenylene, alicyclic polymer of conjugated diene such as butadiene etc.); surfactant, wax; dispersing agent (e.g. stearic acid monoglyceride); conjugated polyene compound and so on.

The conjugated polyene compound contains one or more conjugated double bonds, which is a structure where the two carbon-carbon double bonds are separated by one carbon-carbon single bond. The conjugated polyene compound include a conjugated diene where two carbon-carbon double bonds are separated by one carbon-carbon single bond; a conjugated triene where three carbon-carbon double bonds are separated by two carbon-carbon single bonds; and conjugated polyene compound having more than three double bonds and more than two carbon-carbon single bond wherein the respective double bonds are separated by the single bond. The conjugated polyene compound with 8 or more conjugated carbon-carbon double bonds is colored and therefore likely to give colorized the molded product. For this reason, it is preferable to employ a conjugated polyene compound with 7 or less carbon-carbon double bonds. A conjugated polyene compound containing at least one pair of conjugated double bond as well as two or more unconjugated double bond may be used. For instance, tung oil which contains three pair of conjugated trienes in the molecule is included in the conjugated polyene compound used in the invention.

Examples of the conjugated polyene compound include, for instance, conjugated diene compound such as isoprene, myrcene, farnesene, cembrene, sorbic acid, sorbic acid ester, sorbate, abietic acid and so on, each of which contains two carbon-carbon double bonds; conjugated triene compound such as 1,3,5-hexatriene, 2,4,6-octatriene-1-carboxylic acid, eleostearic acid, tung oil, cholecalciferol, each of which contains three carbon-carbon double bonds; conjugated polyene compound such as cyclooctatetraene, 2,4,6,8-decatetraene-1-carboxylic acid, retinol, retinoic acid and so on, each of which 4 or more carbon-carbon double bonds and so on. These conjugated polyene compounds may be used alone or in combination of two or more of them.

The content of the conjugated polyene compound is in the range of usually 0.000001 to 1 parts by weight, preferably 0.00001 to 1 parts by weight, particularly preferably 0.0001 to 0.01 parts by weight, relative to 100 parts by weight of the EVOH resin (A).

It is preferable that such conjugated polyene compound is contained in advance in the EVOH resin (A).

The resin composition used for the invention may contain an additional thermoplastic resin other than EVOH resin, for instance, polyolefin-based resin, polyimide-based resin, polyester-based resin and so on. In the case that the additional thermoplastic resin is contained, the content is preferably less than 10%, more preferably less than 5% by weight based on the total weight of the resin composition.

The EVOH resin composition having the above chemical structure has excellent thermal stability at high temperature, particularly, with less coloration at a high temperature around 280° C., and with less thermal decomposition of EVOH resin.

Specifically, the weight reduction degree of the EVOH resin composition in a nitrogen atmosphere at 280° C. for 1 hour is 15 wt % or less, preferably 10 wt % or less. Further, the weight reduction degree of the EVOH resin composition in a nitrogen atmosphere at 250° C. for 1 hour is 4 wt % or less, preferably 2 wt % or less.

If decomposition gas is generated from the EVOH resin during melt molding, release of generated gas may be blocked by a multilayer structure containing layers of other thermoplastic resin on both sides of the EVOH layer. As a result, bubbles may be generated in the multilayer structure by the decomposition gas, or pinholes may be formed near the bubbles. In contrast, in the inventive EVOH resin composition, the amount of generated gas by thermal decomposition at high temperature is decreased. Accordingly, it is possible to suppress degradation of appearance of a multilayer structure containing the EVOH resin composition layer as an intermediate layer and layers of other thermoplastic resin.

This means that it is possible to obtain a molded product having excellent appearance by melt molding even in high temperature range from 250 to 310° C. Accordingly, it is possible to perform coinjection or coextrusion molding with thermoplastic resin such as aromatic polyester-based resin whose melt molding temperature range lies in a high temperature range. Thus, it is possible to obtain a multilayer structure having excellent adhesiveness and appearance.

Further, in the inventive EVOH resin composition, the content of alkali metal which causes coloration is reduced. Accordingly, coloration after heating is also suppressed, not to mention obtaining an improved pellet state. Accordingly, the inventive EVOH resin composition is suitable as a material for a molded product, in which degradation of appearance, particularly, coloration such as yellowness should be avoided.

<Method of Producing the Resin Composition>

The method of producing the EVOH resin composition of the invention will be explained.

In general, an EVOH resin is produced by saponifying ethylene-vinyl ester-based copolymer solution (solvent: alcohol or water/alcohol) in the presence of alkali catalyst and thus produced EVOH resin is on sale as such. When the EVOH resin produced by saponification is served as (A) an EVOH resin for an EVOH resin composition, the producing method of the EVOH resin composition comprises a step of washing the EVOH resin with acetic acid; a step of washing the EVOH resin with water; and a step of adding acetic acid and alkaline earth metal to the washed EVOH resin.

The alkali catalyst used as a saponification catalyst in producing an EVOH resin includes alkali metal hydroxides such as potassium hydroxide, sodium hydroxide and so on, and alcoholates such as sodium methylate, sodium ethylate, potassium methylate, lithium methylate and so on. An acid derived from vinyl ester and/or alkaline metal salt thereof may be contained as a by-product in an EVOH resin produced by such saponification in the presence of the alkali catalyst. In other words, a typical EVOH resin usually contains impurities including carboxylic acid which is a by-product of the saponification, and alkali metal used in the catalyst. Accordingly, an EVOH resin composition of the invention is prepared by reducing the amount of alkali metal and adjusting the concentrations of alkali earth metal and carboxylic acid having from 2 to 4 carbon atoms for meeting the requirements recited in claims.

Removal of alkali metal is performed by washing the EVOH resin. Examples of the washing method include a method (i), wherein a porous precipitated matter of EVOH resin obtained from a high-concentration EVOH resin solution (paste) is washed with acid or water, and a method (ii), wherein a high-concentration EVOH resin solution (paste) is washed with acid or water.

In the method (i), a well-known method may be used as a method for preparing a porous precipitated matter from an EVOH resin solution. For instance, hydrous pellets as a porous precipitated matter are obtained by extruding and solidifying an EVOH resin solution after saponification into strands in a bath containing a congealed liquid, and cutting the strands of EVOH resin hydrous porous matter into pellets having an appropriate length. The obtained hydrous pellets are contacted with a washing liquid and thereby efficiently removing the alkali metal.

In the method (ii), it is possible to efficiently remove the alkali metal by contacting a high-concentration EVOH resin solution (paste) with a washing liquid in a vessel such as a tray vessel, an agitation vessel, a kneader or the like.

It is possible to provide an EVOH resin in which the concentration of alkali metal is reduced to the specified range by carrying out the above-mentioned washing process.

A water-soluble weak acid such as acetic acid, propionic acid, butyric acid and so on, and preferably, acetic acid is used for an acid in the washing process.

A water in which metal ions as impurities are removed, for instance, deionized water, distilled water, filtered water or the like, is preferably used in the washing process.

In the case that an EVOH resin obtained by hydrolyzing ethylene-vinyl ester-based copolymer resin with acid catalyst is used, or in the case that an EVOH resin having an excessively reduced content of (C) an alkali metal by washing or the like process is used, (C) an alkali metal may be added to the EVOH resin for satisfying the requirement regarding the content thereof. It is possible to increase the content of the alkali metal by immersing the washed EVOH resin in aqueous solution containing the alkali metal (C), or by adding the alkali metal (C) together with (B) an alkaline earth metal and (D) a carboxylic acid having from 2 to 4 carbon atoms to the washed EVOH resin.

The amounts of the alkaline earth metal (B) and the carboxylic acid (D) contained as impurities in the EVOH resin produced by saponification are so low that they have to be added.

Addition of the alkaline earth metal (B) and the carboxylic acid (D) may be conducted in any known manner. They may be added individually or in a form of alkaline earth metal carboxylate.

Exemplary methods of adding the alkaline earth metal (B) and the carboxylic acid (D) to EVOH resin include, for example, (i) a method of dryblending the alkaline earth metal (B) and the carboxylic acid (D) with EVOH resin; (ii) a method of dissolving the alkaline earth metal (B) and the carboxylic acid (D) in water or the like solvent, and then mixing the resultant solution with EVOH resin; (iii) a method of immersing EVOH resin in a solution containing the alkaline earth metal (B) and the carboxylic acid (D); (iv) a method of blending the alkaline earth metal (B) and the carboxylic acid (D) with molten EVOH resin; (v) a method of contacting hydrous porous matter made of EVOH resin solution (solvent; water/alcohol) with a solution containing the alkaline earth metal (B) and the carboxylic acid (D); (vi) a method of adding solutions containing the alkaline earth metal (B) and the carboxylic acid (D) to EVOH resin solution, and then transferring the mixed solution into coagulation bath, and thereby obtaining the precipitate; (vii) a method of contacting the alkaline earth metal (B) and the carboxylic acid (D) with a paste containing concentrated EVOH resin solution. In the methods (i) through (vi) each, an alkaline earth metal carboxylate may be used with or instead of the combination of the alkaline earth metal (B) and the carboxylic acid (D).

The order of the EVOH resin washing step, and the step of adding alkali earth metal and carboxylic acid having from 2 to 4 carbon atoms is not specifically limited. However, in view of the manufacturing efficiency, it is preferable to wash and then add. Particularly, in the case where the methods (i) through (v) are adopted, it is preferable to use an EVOH resin composition whose alkali metal concentration is reduced to a predetermined concentration by washing (and drying, if necessary) in advance. The method (vi) is a method for obtaining EVOH resin composition pellets by washing and drying the hydrous porous matter after the adding step. In the methods (v) and (vi), after the washing step, hydrous porous pellets are immersed in a solution containing alkali earth metal salt of the carboxylic acid. The above methods are advantageous in the aspect of manufacturing, because only one-time drying step is necessary. The method (v) is most preferable in a point that the concentration distribution of an additive in the pellets can be made uniform.

The melt kneading can be performed by using a well-known mixing machine such as an extruder, a Banbury mixer, a kneader-ruder, a mixing roll, or a plastmill. Examples of the extruder include a single screw extruder and a twin screw extruder. It is possible to use a method, wherein a resin composition after melt kneading is extruded into strands, followed by cutting into pellets.

Drying can be performed by a well-known method. Specifically, it is possible to use a ventilation drying method or a fluidized drying method alone or in combination. Drying may be performed while melt kneading in an extruder with a vent. Among these methods, it is appropriate to dry by the fluidized drying method, and then dry by the ventilation drying method. The drying temperature is not specifically limited, but normally is in the range of about 70 to 120° C. The drying temperature may be raised, as drying progresses. The moisture content after drying is normally 1 wt % or less, preferably, 0.5 wt % or less. The dry pellets obtained as described above are fed to a molding step that follows.

In the case that an EVOH resin composition contains (B) alkaline earth metal, (C) alkali metal, and (D) carboxylic acid having from 2 to 4 carbon atoms but the content of at least one of the components (A), (B), and (C) does not meet one of the requirements ($\alpha$), ($\beta$), and ($\gamma$) in the claim, the EVOH resin composition is blended with at least one kind of another EVOH resin composition having a different content of the component (A), (B), or (C), thereby obtaining an EVOH resin composition blend satisfying all requirements ($\alpha$), ($\beta$), and ($\gamma$) in the claim. The obtained EVOH resin composition blend is included in the scope of the invention. Examples of such blend are one prepared by mixing an EVOH resin composition containing less than 10 ppm of (B) alkaline earth metal with an EVOH resin composition containing 20 ppm or more (preferably 50 ppm or more) of (B) alkaline earth metal; and one prepared by mixing an EVOH resin composition having a ratio D/B of less than 5 with an EVOH resin composition having a ratio D/B of 15 or more, preferably 30 or more.

Processes for preparing pellets of EVOH resin composition blend include, but is not limited to, dryblending process by mixing pellets, and a process of melt-kneading with single or twin screw extruder and extruding in a strand, followed by cutting into pellets.

<Method of Molding, Molded Article, and Multilayer Structure>

[Method of Molding]

An EVOH resin composition of the invention may be widely used as a material for a variety of molded articles. The EVOH resin composition may be formed into film, sheet, cup, tube, pipe, bottle and the like molded article, by a known melt-molding such as, for instance, extrusion molding (e.g. T-die extrusion, tubular film extrusion at blow up ratio of normally 0.7 to 6, blow molding, melt spinning, profile extrusion etc.), injection molding and so on. The melt-molding temperature may be normally selected from the range of 150 to 300° C.

[Molded Article]

The EVOH resin composition may be solely used for a material of film, sheet, container, rod, tube, or the like molded article, but preferably used with other thermoplastic resin to provide a multilayer structure containing other thermoplastic resin layer.

A hydrophobicity thermoplastic resin is preferably employed for the other thermoplastic resin used for the multilayer structure. Examples of the hydrophobicity thermoplastic resin include, widely meaning polyolefin including olefin homo- or copolymer such as linear low density polyethylene, low density polyethylene, medium density polyethylene, high density polyethylene, ethylene-vinyl acetate copolymer, ionomer, ethylene-propylene copolymer, ethylene-$\alpha$-olefin ($\alpha$-olefin having 4-20 carbon atoms) copolymer, ethylene-acrylic acid ester copolymer, polypropylene, propylene-$\alpha$-olefin ($\alpha$-olefin having 4-20 carbon atoms) copolymer, polybutene, polypentene and cyclic polyolefin, and modified polyolefin obtained by graft modifying olefin homo- or copolymer with unsaturated carboxylic acid or ester thereof and so on; polystyrene-based resin; polyester-based resin such as polyethylene terephthalate, polybutylene terephthalate and so on; polyamide-based resin such as polyamide, copolymerized polyamide and so on; polyvinyl chloride, polyvinylidene chloride, acrylic resin, vinyl ester-based resin such as polyvinyl acetate and so on; polyurethane-based resin, chlorinated polyethylene, chlorinated polypropylene and other thermoplastic resin. Of these, polyester-based resin is particularly preferably used.

[Polyester-Based Resin]

As the polyester-based resin, aliphatic polyester-based resin and aromatic polyester-based resin both may be used, and preferably aromatic polyester-based resin is used due to excellent in stiffness and heat resistance.

An aliphatic polyester-based resin is a thermoplastic polymer in which aliphatic alkyl chains are linked via ester bond, and includes, for instance, polylactic acid, polyhydroxybutyrate, polybutylene succinate, polyglycolic acid, and polycaprolactone.

An aromatic polyester-based resin is a polymer obtainable by condensation polymerizing mainly glycol and aromatic dicarboxylic acid or alkyl ester thereof. Preferable aromatic polyester-based resin includes a polyester containing ethylene terephthalate unit, and ethylene naphthalate unit as a major repeating unit, and optionally containing additional carboxylic acid unit and/or glycol unit which are comonomer unit making up ester other than ethylene terephthalate and ethylene naphthalate within an amount which does not remarkably impair processability, strength and so on.

In addition to terephthalic acid and naphthalic acid, the acid making up polyester-based resin includes aromatic dicarboxylic acid such as isophthalic acid, diphenyl-4,4'-dicarboxylic acid, diphenoxyethane dicarboxylic acid, 2,6-naphthalenedicarboxylic acid, 2,7-naphthalenedicarboxylic acid and so on, and derivatives thereof capable of forming ester; aliphatic dicarboxylic acid such as adipic acid, sebacic acid, azelaic acid, succinic acid, and derivatives thereof capable of forming ester; alicyclic dicarboxylic acid such as cyclohexanedicarboxylic acid, hexahydroterephthalic acid and so on, and derivatives thereof capable of forming ester; oxy acid such as p-oxy benzoic acid, oxy-caproic acid and so on, and derivatives thereof capable forming ester; trimellitic acid, pyromellitic acid, and so on.

Glycols making up the polyester-based resin include ethylene glycol, diethylene glycol, and other aliphatic glycol such as trimethylene glycol, tetramethylene glycol, neopentyl glycol and so on; alicyclic glycol such as 1,4-cyclohexanedimethanol and so on; aromatic glycol such as bisphenol A, and alkylene oxide addict thereof and so on; polyalkylene glycol such as polyethylene glycol, polypropylene glycol, polytetramethylene glycol and so on; glycerin, 1,3-propanediol, pentaerythritol, and so on.

In the case of aromatic polyester-based resin containing ethylene terephthalate unit as a major repeating unit, the content of ethylene terephthalate unit is in the range of usually 75-100 mol %, preferably 85-100 mol %, furthermore preferably 95-99.5 mol %. Preferable aromatic polyester-based resin has an intrinsic viscosity in the mixed solvent of phenol and tetrachloroethane (weight ratio: 50/50) of usually 0.5-1.3 dl/g, preferably 0.65-1.2 dl/g, particularly preferably 0.70-0.90 dl/g, as measured at 30° C.

In the case of aromatic polyester-based resin containing ethylene naphthalate unit as a major repeating unit, the content of ethylene naphthalate unit is in the range of usually 75-100 mol %, preferably 85-98 mol %. And the intrinsic viscosity is in the range of usually 0.4-1.2 dl/g, preferably 0.55-1.0 dl/g, particularly preferably 0.70-0.90 dl/g.

A mixture of the ethylene terephthalate-based polyester resin and ethylene naphthalate-based polyester resin may be used. Such mixture is favorable because gas-barrier property, UV blocking property, and melt-molding property are improved, comparing with the sole use of each resin. The mixing weight ratio of ethylene terephthalate-based polyester resin to ethylene naphthalate-based polyester resin is in the range of normally 5:95 to 90:10, furthermore 15:85 to 85:15.

Furthermore, an additive or another thermoplastic resin such as MXD-6 nylon, polycarbonate, polyarylate, and liquid crystal polymer may be added to the aromatic polyester-based resin unless some properties are not remarkably impaired.

Out of consideration for global environment as a recent trend, it is possible to use polyester-based resin (polyester-based resin derived from a plant extract) containing a plant extract material, as a polyester resin material (acid component and glycol component), in place of a raw material obtained by refining crude oil. Examples of the acid component derived from a plant extract include components obtained by refining materials e.g. wood plants such as pine trees, citrus fruits such as oranges or lemons, natural fibers, oleaginous plants, carane contained in corn (corn syrup), limonene, lignin, hydroxymethylfurfural, or vegetable oils and so on. As the glycol component derived from a plant extract, it is possible to use components obtained by refining materials e.g. sugar or starch contained in plants such as sugarcane, vulgaris, corn, potatoes; or cellulose contained in rice straw, barley/wheat straw, millet straw, or other grass plants.

[Multilayer Structure]

A multilayer structure of the invention is a multilayer structure containing at least one layer of EVOH resin composition of the invention.

When the multilayer structure comprises other thermoplastic resin layer laid on one or both surfaces of the EVOH resin composition layer, the inventive resin composition layer and the other thermoplastic resin layer may be bonded via an adhesive resin layer, according to needs. Since the EVOH resin composition layer is excellent in thermal stability, the EVOH resin can be coinjected or coextruded with a thermoplastic resin such as aromatic polyester-based resin, which is melt-molded at high temperature. Accordingly, direct adhesion of the inventive EVOH resin composition layer to polyester-based resin layer without adhesive layer is achieved, and can provide a multilayer structure having superior adhesiveness as well as excellent appearance. For this reason, the EVOH resin composition of the invention is favorably used for the multilayer structure containing aromatic polyester-based resin layer. In addition, the EVOH resin composition is suitably applied to a multilayer structure having at least structure of aromatic polyester-based resin layer/EVOH resin composition layer/aromatic polyester-based resin layer.

An layer arrangement of the multilayer structure include, without limitation, three layer structure of II/I/II as well as II/I/II/I, II/I/II/I/II, II/I/II/I/II/I, II/I/II/I/II/I/II, and the like combined layer structure, wherein EVOH resin composition layer (hereinafter, sometimes abbreviated to "EVOH layer") is represented as I, and other thermoplastic resin layer is represented as II, The multilayer structure may further contains a regrind layer, adhesive resin layer, and/or additional thermoplastic resin layer besides the layers I and II. EVOH layer is normally an intermediate layer, however, may be most inner layer used for a heat seal layer, or may be outermost layer when requiring gloss. The multilayer structure having a layer arrangement in which the resin composition layer is contacted with the aromatic polyester-based resin layer significantly obtains effects of the invention.

The thicknesses of layers of the multilayer structure of the invention may be varied depending on layer arrangement, usage, and so on. The thickness of the EVOH layer may be chosen from the range of usually 1 to 100 μm, preferably 5 to 50 μm, the thickness of the other thermoplastic resin layer may be chosen from the range of usually 20 to 3000 μm, preferably 50 to 1000 μm. In the case that the EVOH layer is unduly thin, gas-barrier property is likely to be insufficient, and the control of the thickness is likely to be unstable. On the contrary, in the case that the EVOH layer is unduly thick, there is a tendency of impairing impact resistance and decreasing economic merits.

The total thickness of the other thermoplastic resin layers is usually larger than that of EVOH layers in the multilayer structure, and the ratio of the EVOH layer to other thermoplastic resin layer is usually from 1/2 to 1/100, preferably 1/5 to 1/60, further preferably 1/10 to 1/40.

[Method of Manufacturing Multilayer Structure]

A method of manufacturing the multilayer structure of the invention will be described.

The EVOH resin composition of the invention is suitable for coinjection or coextrusion with other thermoplastic resin to form a multilayer structure.

In the case of manufacturing film or sheet as a multilayer structure, coextrusion is preferably employed. Subsequently, stretching the multilayer film or sheet may be carried out according to needs. The stretching process is a process for obtaining uniform tube or film by heating tube or film evenly and stretching with use of chuck, plug, vacuum, air pressure, blow or the like.

Uniaxial stretching or biaxial stretching may be employed for the stretching process. In the case of biaxial stretching, simultaneous biaxial stretching process and sequential biaxial stretching process may be employed.

A known stretching process such as roll stretching, tenter stretching, tubular stretching (double bubble process, triple bubble process etc.), and stretch blow molding may be employed.

In the case of uniaxial stretching or biaxial stretching (simultaneous biaxial stretching process and sequential biaxial stretching process both applicable), the stretching temperature is chosen from the range of usually 40 to 170° C., preferably 60 to 160° C., at a temperature around the multilayer structure. The stretching ratio is usually from 2 to 50 times, preferably 2 to 20 times in area. After stretching, an annealing treatment may be conducted in order to impart size stability, if necessary. The annealing treatment may be practicable in a well-known manner, for example, by heating the stretched film in tensile condition at a temperature usually between 80 and 180° C., preferably between 100 and 165° C., usually for 2 to 600 seconds.

In coextrusion molding, the extrusion molding temperature for the EVOH resin composition is normally in the range from 150 to 300° C. (preferably from 160 to 250° C.), as necessary. In this example, in the case where thermoplastic resin is a resin coextrusion molded ranging from 230 to 350° C. (preferably from 250 to 330° C.), such as aromatic polyester resin, the temperature of a the in which the EVOH resin and the thermoplastic resin merge is set normally at a temperature between 230 and 350° C., preferably between 250 and 330° C., which is higher than the typical extrusion temperature for an EVOH resin. However, the inventive EVOH resin composition has excellent thermal stability even in a relatively high temperature. Accordingly, even if melt extrusion is performed at aforementioned higher temperature, drawbacks relating to appearance such as coloration, generation of bubbles or pinholes are less likely to occur, and as a result, a multilayer structure (sheets, films) having excellent appearance can be obtained.

The thus obtained multilayer structure may be formed into any shape, such as films, sheets or tapes. Further, the multilayer structure may be subjected to, as necessary, annealing treatment, cooling treatment, drawing, printing, dry laminating, solution or melt coated, subjected to deposition with organic/inorganic matter, processed into bags, subjected to deep drawing or the like. In the case where high gas barrier properties are required, it is preferable to form a layer of metal or inorganic matter such as aluminum, alumina ($Al_2O_3$), silica ($SiO_x$, where x=1 or 2) on the multilayer structure by vapor deposition.

It is possible to subject the thus obtained multilayer structure in the form of films or sheets to secondary processing such as vacuum forming, pressure forming, vacuum pressure forming or the like. By the secondary processing, it is possible to obtain containers with wide openings such as cups and trays.

Containers such as cups and trays, and bags and lids made of films or sheets as obtained above are very useful as food packages for seasonings such as mayonnaise or dressing, fermented foods such as "miso", oils and fats such as cooking oils, and pet foods, in addition to ordinary foods. Further, in the case where meat is packed for storage with use of these containers, films or sheets, case-ready packaging system, vacuum skin packaging system, or the like is adopted.

Further, due to excellent appearance properties, gas barrier properties and solvent barrier properties, they are useful for various purposes of use such as films for agricultural use, films for wall paper, balloons, inner liners of tire, vacuum insulation panels and so on.

[Multilayer Hollow Container]

A method of manufacturing the hollow container with multilayer structure wall such as tank and bottle will be explained.

Coinjection blow molding and coextruding blow molding are preferably employed for the method of manufacturing the hollow container. Particularly, coinjection biaxial stretch blow molding method is suitable for the hollow container using the EVOH resin composition of the invention.

A coinjection biaxial stretch blow molding is a method, wherein a preform (container precursor) having a multilayer structure comprising at least an EVOH layer as an intermediate layer, and layers of other thermoplastic resin on both sides of the EVOH layer, is manufactured by coinjection molding; followed by heating in a die at a predetermined constant temperature, while mechanically stretching in vertical direction (blow molding), and blowing up in circumferential direction by simultaneously or consecutively supplying pressurized air.

In the case where a preform having a multilayer structure is manufactured, normally, an injection molding machine equipped with two injection cylinders and a multilayer manifold system is used. The preform is obtained by injecting molten EVOH resin composition and other thermoplastic resin from the respective injection cylinders into a die through the multilayer manifold system simultaneously or with a time lag.

For instance, a preform having a 3-layer structure of other thermoplastic resin layer/EVOH layer/other thermoplastic resin layer in a state that the intermediate EVOH layer is completely sealed between the other thermoplastic resin layers on both sides of the EVOH layer is obtained by injecting other thermoplastic resin for outer layers on both sides, and then injecting the EVOH resin composition for an intermediate layer, thus continuing injection of the EVOH resin composition of a predetermined amount, followed by injection of other thermoplastic resin.

Further alternatively, it is possible to obtain a preform having a 2-type 5-layer structure of other thermoplastic resin layer/EVOH layer/other thermoplastic resin layer/EVOH layer/other thermoplastic resin layer by injecting other thermoplastic resin for inner and outer layers, then injecting the EVOH resin composition, and simultaneously or consecutively injecting other thermoplastic resin for a center layer.

The cylinder temperature in coinjection molding the preform is appropriately selected from the range between 150 and 350° C. depending on resin types, melting point, thermal decomposition point and so on, of other thermoplastic resin. As for aromatic polyester-based resin, it is selected from the range of usually 230-350° C., furthermore 250-330° C., particularly 270-310° C. When the molding temperature is unduly low, aromatic polyester-based resin is not melted enough to be injected.

The cylinder temperature in injection molding EVOH resin composition is selected from the range of usually 150-300° C., preferably 160-270° C., further preferably 170-260° C., and appropriately selected depending on the temperature at multilayer manifold portion where the EVOH resin and the other thermoplastic resin merge.

The temperature of the multilayer manifold portion where EVOH resin composition and other thermoplastic resin merge is usually set to meet an injection molding temperature (cylinder temperature) for the resin requiring a higher temperature for molding. Accordingly, in the case that an aromatic polyester-based resin is used as other thermoplastic resin, the temperature at multilayer manifold portion where EVOH resin composition and aromatic polyester-based resin are contacted with each other is normally between 230 and 350° C., preferably between 250 and 330° C., more preferably between 270 and 310° C. Even if the temperature of the manifold portion is set such a high temperature range, the EVOH resin composition can be stably coinjection molded, because the EVOH resin composition of the invention has excellent resistance against thermal decomposition such that the weight reduction degree is not more than 15% by weight after staying at 280° C. in a nitrogen atmosphere for 1 hour.

In addition, the temperature of the mold into which EVOH resin composition and the other thermoplastic resin are flown is normally set between 0 and 80° C., preferably between 5 and 60° C., more preferably between 10 and 30° C. When the temperature is unduly low, moisture condensation sometimes occurs in the mold and therefore the appearance of the resulting preform or bottle is deteriorated. On the contrary, when the temperature is above 80° C., blow moldability of the obtained preform is lowered, or transparency of the obtained bottle is lowered.

Thus, the multilayer preform is obtained. The desired bottles can be obtained by mechanically stretching the preform in vertical direction directly or after re-heating in a blow die at a predetermined temperature, followed by blowing up in circumferential direction by simultaneously or consecutively supplying pressurized air.

It is possible to use a method (hot parison method), wherein an injection-molded preform is immediately fed to a re-heating step in a hot state for blow molding, or a method (cold parison method), wherein after an injection-molded parison is held for a predetermined period in a room temperature condition, the parison is fed to a re-heating step for blow molding. Generally, it is preferable to use the cold parison method in view of excellent productivity of products such as bottles filled with a matter.

The preform is re-heated with a heater device such as infrared heater and block heater at a temperature of typically 80 to 150° C. In the case that the temperature is too low, the preform is not sufficiently uniform stretched, resulting in obtaining a multilayer container with ununiform hollow shape and ununiform thickness. In the case that the temperature is too high, a resulting multilayer hollow container containing aromatic polyester-based resin layer is sometimes whitened because crystallization of the aromatic polyester-based resin is promoted at such higher temperature.

The desired multilayer hollow container is obtained by biaxial stretching the reheated preform. Generally, a desired multilayer hollow container is produced by mechanically stretching the reheated preform in vertical direction at about 1-7 times with plug, rod or other tools, and then stretching the preform in cross direction at about 1-7 times with pressurized air. The stretching in vertical direction and cross direction may be conducted simultaneously or sequentially. Also, stretching in vertical direction may be conducted using pressurized air together with the aforementioned tools.

Preferably, thus obtained multilayer hollow container of the invention has a pressure resistance strength of usually 25 kg/cm$^2$ or more, further 30 kg/cm$^2$ or more. The value of the pressure resistance strength is measured by pressure resistance measuring apparatus (KT-5000 from EWIG Co. Ltd.).

The volume of the multilayer hollow container is properly determined from the range normally of 50 mL to 10 L, preferably 50 mL to 5 L, more preferably 50 mL to 2 L. A preferable multilayer hollow container preferably has at least structure of polyester-based resin layer/EVOH layer/polyester-based resin layer. In particular, a preferable multilayer structure has 2-type 3-layer structure of aromatic polyester-based resin layer/EVOH layer/aromatic polyester-based resin layer.

The multilayer structure of the invention is useful for a multilayer wide-mouth container such as cup or tray, multilayer hollow container such as tank or bottle, and other various containers, preferably for a multilayer hollow container, more preferably for a multilayer bottle.

These containers are preferably used for various containers for not only general foods but also as condiment such as soy sauce, sauce, ketchup, mayonnaise, dressing and so on; fermented food such as miso and vinegar and so on; fat and oil food such as salad oil; alcohol drink such as sake, beer, sweet cooking sake, whisky, shochu, wine and so on; beverage such as carbonated drink, juice, sports drink, milk, coffee beverage, oolong tea, black tea, mineral water and so on; cosmetics, pharmaceuticals, detergent, fragrances, chemical industrial material, pesticide (agricultural chemicals or agrochemicals) and so on, particularly containers for beverages such as beer, wine, carbonated drink, soft drinks, tea, milk, coffee beverage; condiment such as sauce, ketchup, dressing and so on.

EXAMPLE

Hereinafter, the present invention is described specifically with reference to Examples, but the invention is not limited to the description unless exceeding its gist.

Incidentally, "parts" and "%" in the Examples are on the weight basis, unless otherwise indicated.

<Production and Evaluation of EVOH Resin Composition Pellets Nos. 1 through 9>

[Production of EVOH Resin Composition Pellets Nos. 1 through 9]

Into a 1 m$^3$ polymerization tank having a cooling coil, charged were 500 kg vinyl acetate, 80 kg methanol, 300 ppm (relative to vinyl acetate) acetylperoxide, 30 ppm (relative to vinyl acetate) citric acid, and 14 kg 3,4-diacetoxy-1-butene. The air in the tank was temporarily substituted with nitrogen gas, followed by substitution with ethylene. Then, the ethylene was pressurized until the ethylene pressure reached 43 kg/cm$^2$. The reaction temperature was raised to 67° C. accompanied by agitation, and polymerization was performed for 6 hours until the polymerization rate reached 50%. Thereafter, the polymerization reaction was stopped, and ethylene-vinyl acetate-diacetoxybutene terpolymer with ethylene content of 33 mol % was yielded.

To a methanol solution containing the ethylene-vinyl acetate-diacetoxybutene terpolymer, added was a methanol solution containing 0.012 equivalent of sodium hydroxide relative to acetic acid group remained in the terpolymer, for saponification. Thus, an EVOH resin/methanol solution (EVOH resin: 30%, methanol: 70%) was yielded wherein the EVOH resin has 1.0 mol % of the aforementioned 1,2-glycol unit (see formula (1a)). The saponification degree of acetyloxy moiety in the EVOH resin was 99.6 mol %, and MFR of pellets after drying was 13 g/10 min (210° C., load: 2,160 g).

The obtained EVOH resin/methanol solution was extruded in cold water into strands. The strands (hydrous porous matter) were cut by a cutter into EVOH resin porous pellets of 3.8 mm-diameter, 4 mm-length with resin content of 35%.

The obtained porous pellet was washed with 0.5% acetic acid aqueous solution until the sodium content relative to EVOH resin is up to the concentration indicated in Table 1. After then, the porous pellet was immersed in acetic acid/magnesium acetate aqueous solution in which acetic acid concentration (relative to EVOH resin) and magnesium acetate concentration (relative to water) are shown in Table 1, followed by drying at 110° C. for 8 hours under nitrogen gas current containing at most 0.5% oxygen.

The dried EVOH resin composition pellet has the contents of alkaline earth metal (Mg), alkali metal (Na), and acetic acid and MFR value as shown in Table 1. The contents are measured by the method described below. The thus obtained EVOH resin composition pellets Nos. 1-9 were evaluated in volatile content, coloration, appearance, thermal decomposition resistance, and adhesiveness to polyester-based resin, according to the following evaluation method. The evaluation results are shown in Table 1.

[Evaluation Method of Composition Pellet]

(1) Alkali Metal (Na) Content, Alkaline Earth Metal (Mg) Content (wt %)

The incinerated EVOH resin composition pellet was dissolved in an aqueous solution containing hydrochloric acid. Alkali metal (Na) content and alkaline earth metal (Mg) content were measured by atomic absorption photometry (atomic absorption photometer of Hitachi) and determined based on a light absorption ratio of each measurement value to a standard solution.

(2) Acetic Acid Content (ppm)

The EVOH resin composition pellets after drying were pulverized by frost shattering. The pulverized EVOH resin composition was sieved by a sieve having nominal size of 1 mm (standard sieve specified by JIS Z-8801). 10 g EVOH resin composition powder that has passed through the mesh of the sieve, and 50 ml ion-exchange water were put in a 100 ml stoppered conical flask. Then, a cooling condenser was attached to the flask, and the mixture was agitated for extraction for 10 hours at 95° C. 2 ml of the obtained extraction liquid was diluted with 8 ml ion-exchange water. The amount of acetic acid was determined by quantitatively analyzing with ion chromatography of the diluted extraction liquid and calculating based on a calibration curve of acetic acid aqueous solution.

(3) Volatile Content 10 g of the EVOH resin composition pellets after drying was put in an aluminum cup, and the cup was placed in an oven "PHH-200" (TABAI ESPEC) set at 150° C. for 5 hours. The weight of the pellets was measured before and after the cup was placed in the oven, and a degree of reduction (wt %) relative to the weight before heating was calculated as a volatile content.

(4) Coloration 10 g of the EVOH resin composition pellets after drying was put in an aluminum cup, and the cup was heated in an inert oven "DN63HI" (Yamato Scientific Co., Ltd.) in N2 gas atmosphere at (i) 230° C. for 10 min or at (ii) 280° C. for 10 min. The EVOH resin composition pellets were melted by heating, and EVOH resin in the form of a plate (diameter: 55 mm, thickness: 4 mm) was obtained. After solidifying the EVOH plate by cooling, a degree of coloration was evaluated by YI value (yellowness index) using a spectrocolorimeter "SE-2000" (Nippon Denshoku Industries Co., Ltd.).

The above heating condition (i) is a model experiment for recreating an environment in which EVOH resin stays for a long period in an injection molding machine, and the condition (ii) is a model experiment for recreating an environment in a multilayer manifold system in which EVOH resin and aromatic polyester resin merge. Both of the models show that as the YI value after the heating experiment decreases, thermal coloration decreases, and as the YI value increases, thermal coloration e.g. yellowness increases.

(5) Appearance

The number of bubbles having a diameter of 1 mm or more in a center portion (3 cm×3 cm square) of the EVOH plate obtained by the coloration evaluation (4) was counted by visual observation.

○ ... the number of bubbles is smaller than 5

Δ ... the number of bubbles is not smaller than 5 but smaller than 10

× ... the number of bubbles is not smaller than 10

(6) Thermal Decomposition Resistance (Weight Reduction Degree: Wt %)

The EVOH resin composition pellets after drying were placed in a nitrogen atmosphere at each temperatures 250° C. and 280° C. for 1 hour. The weight of the pellets before and after the placing at each of the temperatures was measured, and a degree of reduction (wt %) relative to the weight before heating was calculated. A thermogravimetric analyzer "PYRIS1 TGA" (PerkinElmer) was used for evaluation.

(7) Adhesiveness to Polyester-Based Resin (T-Peel Strength of Multilayer Film of PET/EVOH/PET Obtained by Coextrusion)

The dried EVOH resin composition pellets and polyethylene terephthalate (PET) resin pellets ("BK6180C" from Japan Unipet Co., Ltd., density 1.4 g/cm$^3$, melting point of 250° C., intrinsic viscosity 0.83 dl/g, isophthalic acid-modification amount: 2 mol %) were fed to multilayer extruder equipped with multi T die of feedblock 3-type 5-layer, to give a multilayer film of PET/PET/EVOH/PET/PET having respective thickness of 35/5/20/5/35 μm. The obtained multilayer structure is substantially corresponded with a film of 2-type 3-layer having thickness of 40/20/40 μm. Adhesiveness between layers was evaluated by measuring T-peel strength between PET layer and EVOH layer of the obtained multilayer film with use of autograph.

(Condition of Producing Film by Coextrusion)

extruder for intermediate layer (EVOH layer): single screw extruder having 40 mm-diameter (barrel temperature: 230° C.)

extruders for 1$^{st}$ upper and 1$^{st}$ lower layers (PET layers): single screw extruder having 40 mm-diameter (barrel temperature: 280° C.)

extruders for 2$^{nd}$ upper, 2$^{nd}$ lower layers (PET layers): single screw extruder having 32 mm-diameter (barrel temperature: 280° C.)

T die: 3-type 5-layer feedblock type (die temperature: 260° C.)

take-off speed: 7 m/min roll temperature: 70° C.

(Condition of T-Peel Strength Test)

apparatus: Autograph AGS-H (SHIMADZU CORPORATION)

load cell: 50 N test method: T-peel method where layers is delaminated in forming T-shape test piece size: 15 mm width test speed: 300 mm/min

TABLE 1

| | | | Example | | | |
|---|---|---|---|---|---|---|
| | | Pellet No | 1 | 2 | 3 | 4 |
| Composition | Treatment | Na content after washing*[1] | 2 ppm | 2 ppm | 2 ppm | 2 ppm |
| | | immersion in acetic acid/Mg acetate aqueous solution (acetic acid, Mg acetate)*[2] | 3000 ppm 0.02 wt % | 5000 ppm 0.02 wt % | 3000 ppm 0.023 wt % | 3000 ppm 0.026 wt % |

TABLE 1-continued

|  |  |  | | | | |
|---|---|---|---|---|---|---|
| | | Na relative to EVOH resin (ppm) | 0.6 | 0.6 | 2.2 | 1.6 |
| | | Mg relative to EVOH resin (ppm) | 26 | 22.9 | 29.1 | 36.8 |
| | | acetic acid relative to EVOH Resin (ppm) | 330 | 570 | 380 | 375 |
| Ratio | | C/B (Na/Mg) | 0.023 | 0.026 | 0.076 | 0.043 |
| | | D/B (acetic acid/Mg) | 12.7 | 24.9 | 13.1 | 10.2 |
| Evaluation | | MFR (g/10 min) | 13 | 13 | 14 | 14 |
| | | volatile content (wt %) | 0.23 | 0.20 | 0.25 | 0.24 |
| | coloration | 230° C. × 10 min | 0.16 | 0.52 | 0.71 | 0.66 |
| | | 280° C. × 10 min | 7.3 | 8.8 | 10.2 | 9.6 |
| | appearance (number of bubbles) | 230° C. × 10 min | ○ (0) | ○ (0) | ○ (0) | ○ (0) |
| | | 280° C. × 10 min | ○ (1) | ○ (1) | ○ (2) | ○ (3) |
| | thermal decomposition resistance (wt %) | 250° C. × 1 hr | 1.8 | 0.9 | 2.2 | 2.9 |
| | | 280° C. × 1 hr | 7.4 | 6.7 | 10.9 | 13.5 |
| | | adhesiveness to PET (N/15 mm) | 0.25 | 0.15 | 0.27 | 0.30 |

| | | | Comparative Example | | | | |
|---|---|---|---|---|---|---|---|
| | | Pellet No | 5 | 6 | 7 | 8 | 9 |
| Composition | Treatment | Na content after washing*[1] | 700 ppm | 2 ppm | 2 ppm | 2 ppm | 2 ppm |
| | | immersion in acetic acid/Mg acetate aqueous solution (acetic acid, Mg acetate)*[2] | 3800 ppm 0.02 wt % | 1000 ppm 0.02 wt % | 8000 ppm 0.02 wt % | 3000 ppm 0.004 wt % | 3000 ppm 0.04 wt % |
| | | Na relative to EVOH resin (ppm) | 197 | 0.7 | 2.5 | 0.8 | 1.1 |
| | | Mg relative to EVOH resin (ppm) | 30 | 35.4 | 21.2 | 5.8 | 51 |
| | | acetic acid relative to EVOH Resin (ppm) | 460 | 160 | 935 | 382 | 390 |
| Ratio | | C/B (Na/Mg) | 6.6 | 0.020 | 0.118 | 0.138 | 0.022 |
| | | D/B (acetic acid/Mg) | 15.3 | 4.5 | 44 | 66 | 8 |
| Evaluation | | MFR (g/10 min) | 12 | 12 | 14 | 14 | 14 |
| | | volatile content (wt %) | 0.15 | 0.14 | 0.29 | 0.26 | 0.23 |
| | coloration | 230° C. × 10 min | 17 | 0.94 | 0.75 | 0.15 | 1.1 |
| | | 280° C. × 10 min | 75 | 14 | 9.9 | 6.9 | 22 |
| | appearance (number of bubbles) | 230° C. × 10 min | ○ (0) | ○ (0) | ○ (0) | ○ (0) | ○ (0) |
| | | 280° C. × 10 min | X (43) | X (45) | ○ (0) | ○ (0) | X (46) |
| | thermal decomposition resistance (wt %) | 250° C. × 1 hr | 11.2 | 4.3 | 1.4 | 0.3 | 4.9 |
| | | 280° C. × 1 hr | 37.5 | 19.6 | 4.1 | 1 | 50.8 |
| | | adhesiveness to PET (N/15 mm) | 0.23 | 0.31 | 0.11 | 0.06 | 0.35 |

*[1]content relative to EVOH resin
*[2]Upper row: acetic acid content(ppm) relative to EVOH resin. Lower row: Mg acetate content (wt %) relative to water.

Pellets Nos. 1 through 4 are examples of the invention, and pellets Nos. 5 through 9 are comparative examples.

The pellets Nos. 1-4, in which the contents of Na, Mg, and acetic acid each relative to EVOH resin were adjusted to fall in the range recited in the invention, retained adhesiveness to polyester-based resin. Also weight reduction of the each pellet Nos. 1-4 after heating at high temperature such as 250° C. or 280° C. is small, which means excellent thermal stability. Although pellets Nos. 1-4 were colored after heating at as high as 280° C. as compared with after heating at 230° C., colored level of each pellet Nos. 1-4 is less than that of pellets Nos. 5 and 6 heated at 280° C. Furthermore, it is found that pellets Nos. 1-4 were superior in appearance, because few bubbles (only one bubble in some cases) were observed in pellets Nos. 1-4 heated at 280° C.

On the other hand, pellet No. 5 has a high Na content after washing, and as a result, pellet No. 5 has high alkali metal content in the EVOH resin composition and C/B (Na/Mg) of 0.5 or more. The pellet No. 5 exhibited a similar evaluation result to that of examples (pellets Nos. 1-4) with respect to the adhesiveness to polyester-based resin. However, the pellet No. 5 was densely colored and likely to generate bubbles at high temperature. Furthermore, the weight reduction of the pellet No. 5 after heating at high temperature such as 250° C. or 280° C. was larger than that of pellet No. 6, which means that the pellet No. 5 is more likely to decompose at high temperature than the pellet No. 6, despite of the similar volatile contents at 150° C. between them.

Pellet No. 6 was prepared by conducting the immersion treatment in a solution having low acetic acid content and D/B (acetic acid/Mg) ratio of 5 or less. Accordingly, thus prepared pellet No. 6 had a lower acetic acid content in EVOH resin composition. The adhesiveness of the pellet No. 6 to polyester-based resin is as high as that of examples (pellets Nos. 1-4). However, the pellet No. 6 was more densely colored and more likely to generate bubbles, as compared with pellets Nos. 1-4. These are supposed due to low acetic acid content in EVOH resin composition. Although the pellet No. 6 exhibited a similar result to pellets Nos. 1 and 2 with respect to the volatile content at 150° C., the weight reduction degree is larger at 250° C. or more, especially 280° C., and therefore it is understood that the pellet No. 6 is more likely to decompose at high temperature.

Pellet No. 7 was prepared by conducting the immersion treatment in a solution having high acetic acid content and D/B (acetic acid/Mg) ratio above 30. Accordingly, thus prepared pellet No. 7 had a higher acetic acid content in EVOH resin composition. The adhesiveness of the pellet No. 7 to polyester-based resin is remarkably lowered comparing with that of examples (pellets Nos. 1-4), presumably due to unduly high acetic acid content in EVOH resin composition. Such a small adhesiveness is caused to easily delamination between polyester-based resin layer and EVOH layer in the case of multilayer container such as bottle and cup using the composition.

Pellet No. 8 was prepared by conducting the immersion treatment in a solution having a low magnesium acetate content and less than 10 ppm Mg. Thus prepared pellet No. 8 has a smaller weight reduction degree at high temperature than examples (pellets Nos. 1-4), and superior thermal decomposition resistance. However, the adhesiveness of the pellet No. 8 to polyester-based resin is remarkably lowered comparing with that of examples (pellets Nos. 1-4), presumably due to unduly low magnesium content in EVOH resin composition. Such a small adhesiveness is caused to easily delamination between polyester-based resin layer and EVOH layer in the case of multilayer container such as bottle and cup using the composition.

Pellet No. 9 was prepared by conducting the immersion treatment in a solution having a high magnesium acetate content and more than 50 ppm Mg. Thus prepared pellet No. 9 has a larger and superior adhesiveness to polyester-based resin than examples (pellets Nos. 1-4). However, the pellet No. 9 had a larger weight reduction degree at high temperature, especially 280° C., presumably due to unduly high magnesium content in EVOH resin composition. From this result, it is understood that the pellet No. 9 is inferior to examples (pellets Nos. 1-4) with respect to thermal decomposition resistance.

In the case of pellet No. 2, where a solution having a higher acetic acid content was used in the immersion treatment, the adhesiveness is relatively lowered. However, since the acetic acid content relative to that of alkaline earth metal is adjusted to the range recited in the invention, coloration at high temperature and generation of bubbles were suppressed, and stability under high temperature such as 250° C. or 280° C. was still retained.

In the case of pellets Nos. 3 and 4, which were prepared by immersion treatment using a solution having a higher magnesium acetate content, stability under heating at high temperature tended to be lowered. However, as seen from the fact that the adhesiveness to polyester-based resin was slightly increased, the contents of alkaline earth metal, alkali metal, and acetic acid each can be appropriately chosen in the range recited by the invention according to use and intended properties.

<Stretch Blow Moldability of Multilayer Structure and Delamination Resistance Under Impact of Multilayer Container>
[Production of EVOH Resin Composition Pellet No. 10]

All processes for preparing pellet No. 1 except no addition of 3,4-diacetoxy-1-butene for polymerization were repeated to obtain ethylene-vinyl acetate copolymer having ethylene content of 33 mol %.

EVOH resin composition pellet No. 10 was obtained from the ethylene-vinyl acetate copolymer prepared above by saponifying, precipitating porous pellet, washing, immersing in acetic acid/magnesium acetate aqueous solution, and drying in the same manner as pellet No. 1. The volatile content of the EVOH resin composition pellet No. 10 is 0.23% by weight.

[Production and Evaluation of Multilayer Structures S1,S2 and S3]

The EVOH resin composition pellets No. 1, No. 8, and No. 10 prepared above were used to produce for multilayer structures S1, S2, and S3 respectively as follows. The EVOH resin composition pellet and polyethylene terephthalate (PET) resin ("BK6180C" from Japan Unipet Co., Ltd. having density of 1.4 g/cm$^3$, melting point of 250° C., intrinsic viscosity of 0.83 dl/g, and isophthalic acid modification amount of 2 mol %) were fed to multilayer extruder equipped with multi T die of feedblock 3-type 5-layer, and coextruded under the following conditions to obtain multilayer structure of PET/PET/EVOH/PET/PET having thickness of 150/20/60/20/150 μm. The multilayer structure is substantially corresponded to 2-type 3-layer sheet having thickness of 170/60/170 μm. Stretch blow moldability of the obtained multilayer structures S1, S2, and S3 each was evaluated according to the following evaluation method.

The obtained multilayer structures S1, S2, and S3 were formed into multilayered tray with use of vacuum-pressure forming apparatus (manufactured from Asano Laboratories Co., Ltd.) and evaluated with respect to delamination resistance against impact. The evaluation results were shown in Table 2.

(Conditions of Manufacturing Coextruded Sheet)
extruder for intermediate layer (EVOH): single screw extruder having 40 mm-diameter (barrel temperature: 230° C.)
extruders for 1$^{st}$ upper and 1$^{st}$ lower layers (PET): single screw extruder having 40 mm-diameter (barrel temperature: 280° C.)
extruders for 2$^{nd}$ upper, 2$^{nd}$ lower layers (PET): single screw extruder having 32 mm-diameter (barrel temperature: 280° C.)
T the 3-type 5-layer feedblock type (die temperature: 250° C.)
take-off speed: 2 m/min
roll temperature: 50° C.
(Evaluation Method on Stretch Blow Moldability of Multilayer Structure)

The obtained multilayer structure was set in a vacuum pressure forming machine (Asano Laboratories Co., Ltd.) without a molding die, and heated at a heater temperature of 300° C. for 30 to 45 seconds (sheet surface temperature range: 124 to 142° C.). Thus, the multilayer structure was subjected to pressure stretching at an air pressure of 0.6 kg/cm$^2$, and a balloon-shaped stretched multilayer structure was obtained.

After the balloon-shaped stretched multilayer structure was filled with water, the volume of the balloon was calculated by measuring the volume of the water with a measuring cylinder. This model experiment is an experiment, wherein a tensile force in a wider range than a tensile force range for use in an industrial stretch forming is exerted on a multilayer structure by using a vacuum pressure forming machine without a molding die. Accordingly, the model experiment method employs a more severe condition than actual industrial manufacturing methods.

Knowing the volume of the balloon-shaped stretched multilayer structure helps to check the stretching ability against a very strong tensile force (i.e. stretch blow moldability). It can be said that the larger the volume is, the easier the multilayer structure can be stretched at a high stretching ratio, which means excellent stretch blow moldability.

Further, it is possible to know an appropriate stretching temperature range by observing the above tendency by changing a heating time.
(Multilayer Container Manufacturing Condition and Measurement on Delamination Resistance Against Impact)

Tray-shaped multilayer containers were manufactured from the obtained multilayer structure by a vacuum forming machine (Asano Laboratories Co., Ltd.).
dimensions of a die: 110 mm-length, 85 mm-width, 25 mm-depth
heater temperature: 300° C.
heating time: 25 sec
sheet surface temperature: 120° C.

The manufactured tray-shaped multilayer containers were compressed and deformed by a compression molding machine in a state that the tray bottom surfaces faced upward. After cuts were formed in the compression-deformed tray bottom surfaces by a cutter, the tray bottom surface portions were immersed in black ink for 30 seconds. A delamination resistance against impact exerted on the compression-deformed tray-shaped multilayer containers was visually observed based on the following evaluation criteria, in view of an ink absorption condition by capillary action into the trays. The evaluation was performed as follows.

○ . . . Permeation of black ink into a tray side surface was not observed, and the appearance was good.

× . . . Black ink was permeated into a tray side surface, and the outer surface was stained black. This means that interlayer was delaminated by impact, and delamination resistance against impact was insufficient.

employed, and can be stretch blow molded from a temperature as low as 128° C. On the other hand, multilayer structure S3 in which EVOH resin without 1,2-diol unit in a side chain is employed as a raw material required to be heated up to 137° C. for stretch blow molding. Furthermore, the volume of the multilayer structure S1 can be increased about two times as much as that of the multilayer structure S3 under a high temperature above 140° C., which means that the multilayer structure S1 can be stretched at high ratio.

Similar results to the above results would be observed in the case that a multilayer container such as bottle and cup is manufactured by blow molding. As can be seen, multilayer structure S1 employing EVOH resin having 1,2-diol structural unit in a side chain is excellent in stretchability by air pressure, and therefore can be stretch blow molded in a wide temperature range.

TABLE 2

| | | | Multilayer structure No. | | |
|---|---|---|---|---|---|
| | | | S1 | S2 | S3 |
| Composition pellet No. | | | No. 1 | No. 8 | No. 10 |
| Na relative to EVOH resin (ppm) | | | 0.6 | 0.8 | 0.6 |
| Mg relative to EVOH resin (ppm) | | | 26 | 5.8 | 26 |
| acetic acid relative to EVOH resin (ppm) | | | 330 | 382 | 330 |
| C/B (Na/Mg) | | | 0.023 | 0.138 | 0.023 |
| D/B (acetic acid/Mg) | | | 12.7 | 66 | 12.7 |
| stretch blow moldability | volume of stretched multilayer structure ($cm^3$) | sheet surface temperature 124° C. (heating time 30 sec) | 30 | 30 | 30 |
| | | sheet surface temperature 128° C. (heating time 33 sec) | 650 | 650 | 35 |
| | | sheet surface temperature 133° C. (heating time 37 sec) | 940 | 940 | 60 |
| | | sheet surface temperature 137° C. (heating time 41 sec) | 1060 | 1060 | 850 |
| | | sheet surface temperature 142° C. (heating time 45 sec) | 1430 | 1430 | 760 |
| delamination resistance against impact of multilayer container | | | ○ | X | ○ |

Comparing between multilayer structures S1 and S2, difference in thermal decomposition resistance were observed due to difference between raw materials thereof, however, difference in stretch blow moldability was not observed. In other words, although composition pellet No. 8 exhibited superior thermal stability, the multilayer structure S2 does not show superior in the stretch blow moldability. As for delamination resistance against impact, the multilayer container Si is superior due to the fact that the pellet No. 1 exhibited excellent adhesiveness to polyester-based resin.

Multilayer structure S3 was made from composition pellet No. 10 employing an EVOH resin without 1,2-diol unit in a side chain, and was inferior to the multilayer structure S1 in stretch blow moldability despite that the contents of alkali metal, alkaline earth metal, and acetic acid in raw material pellets are equal respectively between the multilayer structures S3 and S1.

Multilayer structure S1 was made from a resin composition in which EVOH resin having 1,2-diol unit in a side chain was <Evaluation of EVOH Resin Composition Blend Pellets Nos. 11 and 12>

Pellet No. 11 is a pellet blend obtained by mixing the aforementioned EVOH resin composition pellets Nos. 6 and 7, and pellet No. 12 is a pellet blend obtained by mixing the aforementioned EVOH resin composition pellets Nos. 8 and 9, both mixing ratio being indicated in Table 3. The obtained pellet blends were melt-kneaded to a homogenous state, and evaluated with respect to volatile content, coloration, and appearance, and thermal decomposition resistance in the same manner as pellet No. 1. Evaluation of the adhesiveness to polyester-based resin was performed with use of pellet blends by dryblending. Evaluation results are also shown in Table 3.

(Condition of Melt-Kneading Pellets)
    melt-kneading apparatus: Plastgraph® (from Brabender)
    mixer: W50EHT type (volume of 55 cc)
    feeding amount of resin: 50 g
    kneading temperature: 210° C.
    kneading time: 2 minutes
    rotation speed of rotor: 50 rpm

TABLE 3

| | | | Example | |
|---|---|---|---|---|
| | Pellet No | | 11 | 12 |
| Composition | EVOH blend | EVOH (A1) | pellet No. 6 | pellet No. 8 |
| | | EVOH (A2) | pellet No. 7 | pellet No. 9 |
| | | (A1)/(A2) weight ratio | 60/40 | 50/50 |
| | Na relative to EVOH resin (ppm) | | 1.4 | 0.6 |
| | Mg relative to EVOH resin (ppm) | | 29.4 | 28.5 |
| | acetic acid relative to EVOH resin (ppm) | | 460 | 380 |
| Ratio | C/B (Na/Mg) | | 0.048 | 0.032 |
| | D/B (acetic acid/Mg) | | 15.6 | 13.3 |
| Evaluation | MFR (g/10 min) | | 13 | 14 |
| | volatile content (wt %) | | 0.20 | 0.24 |
| | coloration | 230° C. × 10 min | 0.77 | 0.65 |
| | | 280° C. × 10 min | 12.2 | 9.8 |
| | appearance | 230° C. × 10 min | ○ (0) | ○ (0) |
| | (number of bubbles) | 280° C. × 10 min | ○ (1) | ○ (1) |
| | thermal decomposition | 250° C. × 1 hr | 2.3 | 1.5 |
| | resistance (wt %) | 280° C. × 1 hr | 11.3 | 9.0 |
| | adhesiveness to PET (N/15 mm) | | 0.22 | 0.26 |

Pellet No. 11 is a blend of resin composition pellets Nos. 6 and 7 having a ratio D/B of less than 5 and a ratio D/B of 30 or more respectively. Pellet No. 12 is a blend of a resin composition pellets Nos. 8 and 9 containing alkaline earth metal of less than 10 ppm and 50 ppm or more respectively. Both pellets Nos. 11 and 12, as similar to pellet No. 1, retained adhesiveness to polyester-based resin and were excellent in stability at high temperature because of small weight reduction even after heating at high temperature such as 250° C. or 280° C. Accordingly, in the case that an EVOH resin composition does not meet all requirements (α), (β), and (γ) claimed in claim, such EVOH resin can be used by blending with another EOVH resin having a different content of alkaline earth metal, alkali metal or acetic acid to prepare an EVOH resin blend satisfying the all requirements (α), (β), and (γ). The resulting EVOH resin composition blend is available for the EVOH resin composition of the invention and can exhibit the effect of the invention.

<Production and Evaluation of EVOH Resin Composition Pellets Nos. 21 to 25>

To the EVOH resin composition pellet No. 1 prepared above was added a basic amine compound or alkaline metal phosphate at a ratio as indicated in Table 4, and then melt mixed. The resulting mixture was melt-kneaded under the following condition to be extruded in a strand, followed by cutting the strand with pelletizer into cylindrical EVOH resin composition pellets. Thus obtained pellets Nos. 21 to 25 were evaluated with respect to thermal decomposition resistance at 280° C. and adhesiveness to polyester-based resin in the same manner as pellet No. 1. The evaluation results are shown in Table 4. Also the measuring results of pellets Nos. 1 and 5 are shown in Table 4 for reference.

Guanidine carbonate (reagent from Wako Pure Chemical Industries, Ltd.), L-arginine (reagent from Wako Pure Chemical Industries, Ltd.), or polyethylene imine (Wako Pure Chemical Industries, Ltd., average molecular weight of about 600) was used as a basic amine compound, and potassium dihydrogenphosphate (guaranteed reagent from Wako Pure Chemical Industries, Ltd.) was used as an alkaline metal phosphate.

(Extrusion Condition)
extruder: twin screw extruder having 32 mm-diameter (D) L/D=56
Screen pack: 90/90 mesh
vents: all closed
screw rotation speed: 200 rpm
set temperature: C2/C3/C4/C5/C6/C7/C8/C9/C10/C11/C12/C13/C14/C15/C16/D=120/190/200/200/200/200/200/200/200/200/200/200/200/200/200/200° C.
output rate: 18 kg/hr

TABLE 4

| | | | Example | | | | | Comparative Example | |
|---|---|---|---|---|---|---|---|---|---|
| | Composition pellet No. | | 21 | 22 | 23 | 24 | 1 | 5 | 25 |
| Composition(part) | EVOH resin composition pellet No. 1 | | 100 | 100 | 100 | 100 | 100 | — | 100 |
| | EVOH resin composition pellet No. 5 | | — | — | — | — | — | 100 | — |
| | alkali metal phosphate | potassium dihydrogen phosphate | — | — | — | — | — | — | 0.025 (phosphate radical 175 ppm) |
| | basic amine compound | guanidine carbonate | 0.1 | 0.25 | — | — | — | — | — |
| | | L-arginine | — | — | 0.5 | — | — | — | — |
| | | polyethylenimine | — | — | — | 0.25 | — | — | — |
| | content ratio(C/B = (Na + K)/Mg) | | 0.6 | 0.6 | 0.6 | 0.6 | 0.6 | 6.6 | 2.8 |
| Evaluation | thermal decomposition resistance (280° C. × 1 hr)(wt %) | | 8.6 | 9.7 | 11.1 | 12.1 | 7.4 | 37.5 | 1.4 |
| | adhesiveness to PET(N/15 mm) | | 0.33 | 0.33 | 0.30 | 0.26 | 0.25 | 0.23 | 0.08 |

EVOH resin composition pellets Nos. 21 to 24, each containing a basic amine compound, exhibited a larger adhesiveness to polyester-based resin than pellet No. 1. Also the pellets Nos. 21 to 24 were excellent in thermal decomposition resistance at 280° C., and stable in high temperature. From these, it is understood that addition of basic amine compound contributes to improve the adhesiveness to polyester-based resin. In particular, pellets Nos. 21-23 employing basic amino acid or guanidine compound as the basic amine compound were more enhanced in the adhesiveness to polyester-based resin, comparing with an EVOH resin composition pellet employing amine-based polymer.

Pellet No. 25, which corresponds to a pellet obtained by adding alkaline metal phosphate (potassium dihydrogenphosphate) to the resin composition of pellet No. 1, contains 72 ppm potassium and 175 ppm phosphate radical, both relative to EVOH resin, and has C/B ratio of 72.6/26 (i.e. 2.8). The adhesiveness of the pellet No. 25 to polyester-based resin was significantly decreased from that of pellet No. 1, and furthermore, was much lower than the pellet No. 5 having C/B ratio of 6.6. Accordingly, the phosphate content of a preferred EVOH resin composition is reduced from the view of improvement of the adhesiveness to polyester-based resin.

INDUSTRIAL APPLICABILITY

The EVOH resin composition of the invention is more stable because of little coloration and difficulty in thermal decomposition even at high temperature, and therefore can be coextruded or coinjected with a thermoplastic resin having high melting point such as polyester-based resin to provide a multilayer structure having excellent adhesiveness thereto.

The invention claimed is:

1. A saponified ethylene-vinyl ester-based copolymer resin (EVOH resin) composition comprising
   (A) a saponified ethylene-vinyl ester-based copolymer resin;
   (B) an alkaline earth metal;
   (C) an alkali metal; and
   (D) a carboxylic acid having from 2 to 4 carbon atoms,
   wherein the composition satisfies the following requirements ($\alpha$), ($\beta$), and ($\gamma$):
   ($\alpha$) a content of the alkaline earth metal (B) is more than 10 ppm but not more than 50 ppm relative to the saponified ethylene-vinyl ester-based copolymer resin (A);
   ($\beta$) a content ratio (C/B) of the alkali metal (C) to the alkaline earth metal (B) ranges from 0.001 to 0.5; and
   ($\gamma$) a content ratio (D/B) of the carboxylic acid (D) to the alkaline earth metal (B) ranges from 5 to 30.

2. The saponified ethylene-vinyl ester-based copolymer resin composition according to claim 1, wherein a weight reduction of the composition after heating at 280° C. for 1 hour under a nitrogen atmosphere is not more than 15% by weight relative to the weight before heating.

3. The saponified ethylene-vinyl ester-based copolymer resin composition according to claim 1, wherein the alkaline earth metal (B) is magnesium.

4. The saponified ethylene-vinyl ester-based copolymer resin composition according to claim 1, wherein the carboxylic acid (D) is mono- or di-carboxylic acid having from 2 to 4 carbon atoms.

5. The saponified ethylene-vinyl ester-based copolymer resin composition according to claim 1, wherein the alkali metal (C) is potassium or sodium.

6. The saponified ethylene-vinyl ester-based copolymer resin composition according to claim 1, wherein a content of phosphate radical is not more than 5 ppm relative to the saponified ethylene-vinyl ester-based copolymer (A).

7. The saponified ethylene-vinyl ester-based copolymer resin composition according to claim 1, wherein the saponified ethylene-vinyl ester-based copolymer is a saponified ethylene-vinyl ester-based copolymers having 1,2-diol unit represented by the following formula,

[formula 1]

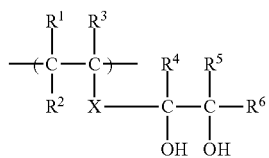

wherein $R^1$, $R^2$, and $R^3$ each represents independently a hydrogen atom or an organic group, X represents single bond or a binding chain, $R^4$, $R^5$, and $R^6$ each represents independently a hydrogen atom or an organic group.

8. The saponified ethylene-vinyl ester-based copolymer resin composition according to claim 1, further comprising (E) a basic amine compound.

9. The saponified ethylene-vinyl ester-based copolymer resin composition according to claim 8, wherein the basic amine compound (E) is a basic amino acid.

10. The saponified ethylene-vinyl ester-based copolymer resin composition according to claim 8, wherein a content of the basic amine compound (E) ranges from 0.01 to 10 parts by weight based on 100 parts by weight of EVOH resin.

11. A multilayer structure comprising at least one layer of a saponified ethylene-vinyl ester-based copolymer resin composition comprising
   (A) a saponified ethylene-vinyl ester-based copolymer resin;
   (B) an alkaline earth metal;
   (C) an alkali metal; and
   (D) a carboxylic acid having from 2 to 4 carbon atoms,
   wherein the composition satisfies the following requirements ($\alpha$), ($\beta$), and ($\gamma$):
   ($\alpha$) a content of the alkaline earth metal (B) is more than 10 ppm but not more than 50 ppm relative to the saponified ethylene-vinyl ester-based copolymer resin (A);
   ($\beta$) a content ratio (C/B) of the alkali metal (C) to the alkaline earth metal (B) ranges from 0.001 to 0.5; and
   ($\gamma$) a content ratio (D/B) of the carboxylic acid (D) to the alkaline earth metal (B) ranges from 5 to 30.

12. The multilayer structure according to claim 11, wherein a layer of thermoplastic resin is laid on at least one of the saponified ethylene-vinyl ester-based copolymer resin composition layer.

13. The multilayer structure according to claim 12, wherein the thermoplastic resin layer is polyester-based resin layer.

14. The multilayer structure according to claim 13, comprising a structure unit of polyester-based resin layer/a saponified ethylene-vinyl ester-based copolymer resin composition layer/polyester-based resin layer.

15. A multilayer hollow container comprising a wall made of a multilayer structure comprising at least one layer of a saponified ethylene-vinyl ester-based copolymer resin composition comprising
   (A) a saponified ethylene-vinyl ester-based copolymer resin;
   (B) an alkaline earth metal;
   (C) an alkali metal; and
   (D) a carboxylic acid having from 2 to 4 carbon atoms,
   wherein the composition satisfies the following requirements ($\alpha$), (13), and ($\gamma$):
   ($\alpha$) a content of the alkaline earth metal (B) is more than 10 ppm but not more than 50 ppm relative to the saponified ethylene-vinyl ester-based copolymer resin (A);

(β) a content ratio (C/B) of the alkali metal (C) to the alkaline earth metal (B) ranges from 0.001 to 0.5; and (γ) a content ratio (D/B) of the carboxylic acid (D) to the alkaline earth metal (B) ranges from 5 to 30.

16. The multilayer hollow container according to claim 15, wherein the multilayer structure is a coinjection molded article.

* * * * *

UNITED STATES PATENT AND TRADEMARK OFFICE
CERTIFICATE OF CORRECTION

| | | |
|---|---|---|
| PATENT NO. | : 8,563,108 B2 | Page 1 of 1 |
| APPLICATION NO. | : 13/669874 | |
| DATED | : October 22, 2013 | |
| INVENTOR(S) | : Shouichi Kani | |

It is certified that error appears in the above-identified patent and that said Letters Patent is hereby corrected as shown below:

In the Claims:

At column 36, line 64 (claim 15, line 11) of the printed patent, "(13)" should read --(β)--.

Signed and Sealed this
Thirty-first Day of December, 2013

Margaret A. Focarino
*Commissioner for Patents of the United States Patent and Trademark Office*